US005625611A

United States Patent [19]

Yokota et al.

[11] Patent Number: 5,625,611

[45] Date of Patent: Apr. 29, 1997

[54] METHOD OF RECORDING ON A RECORDING MEDIUM EMPLOYING AN AUTOMATIC UPDATING OF MANAGEMENT DATA BY MONITORING THE SIGNAL BEING RECORDED

[75] Inventors: Teppei Yokota; Junichi Aramaki, both of Chiba; Nobuyuki Kihara, Tokyo, all of Japan

[73] Assignee: Sony Corporation, Tokyo, Japan

[21] Appl. No.: 698,771

[22] Filed: Aug. 16, 1996

Related U.S. Application Data

[60] Continuation of Ser. No. 465,363, Jun. 5, 1995, abandoned, which is a division of Ser. No. 178,105, Jan. 6, 1994, abandoned.

[30] Foreign Application Priority Data

| | | | |
|---|---|---|---|
| Jan. 6, 1993 | [JP] | Japan | 5-015887 |
| Jan. 6, 1993 | [JP] | Japan | 5-015888 |
| Feb. 16, 1993 | [JP] | Japan | 5-050188 |

[51] Int. Cl.$^6$ .......... G11B 7/00

[52] U.S. Cl. .......... 369/47; 369/32; 369/53

[58] Field of Search .......... 369/47, 56, 59, 369/48, 58, 32, 53

[56] References Cited

U.S. PATENT DOCUMENTS

| | | | |
|---|---|---|---|
| 4,782,401 | 11/1988 | Faerber et al. | 369/50 |
| 4,841,503 | 6/1989 | Yamada etal. | 369/14 |
| 4,932,016 | 6/1990 | Yoshida et al. | 369/48 |
| 5,065,388 | 11/1991 | Roth et al. | 369/47 |
| 5,124,963 | 6/1992 | Ando | 369/32 |
| 5,140,567 | 8/1992 | Kawabata et al. | 369/13 |
| 5,146,369 | 9/1992 | Yamaguchi | 360/15 |
| 5,179,543 | 1/1993 | Nara et al. | 369/3 |
| 5,257,111 | 10/1993 | Kakuyama | 358/342 |
| 5,295,126 | 3/1994 | Okano et al. | 369/47 |
| 5,301,181 | 4/1994 | Shiba et al. | 369/84 |
| 5,319,628 | 6/1994 | Stas et al. | 369/54 |
| 5,325,352 | 6/1994 | Matsumoto | 369/275 |
| 5,331,492 | 7/1994 | Tabuchi et al. | 369/47 |
| 5,331,617 | 7/1994 | Fuma et al. | 369/54 |

(List continued on next page.)

FOREIGN PATENT DOCUMENTS

| | | |
|---|---|---|
| 0097768A2 | 1/1984 | European Pat. Off. . |
| 0257594 | 3/1988 | European Pat. Off. . |
| 0288571A1 | 11/1988 | European Pat. Off. . |
| 0308148A3 | 3/1989 | European Pat. Off. . |
| 0364224A1 | 4/1990 | European Pat. Off. . |
| 0419012A2 | 3/1991 | European Pat. Off. . |
| 0480682A2 | 4/1992 | European Pat. Off. . |
| 0506471A1 | 9/1992 | European Pat. Off. . |
| 0511633A2 | 11/1992 | European Pat. Off. . |
| 0612067A2 | 8/1994 | European Pat. Off. . |
| 4216593A1 | 12/1992 | Germany . |
| 2-123588 | 5/1990 | Japan . |
| WO90/12395 | 10/1990 | WIPO . |

OTHER PUBLICATIONS

Database WPIL, No. 81 B0881D, Derwent Publications Ltd., London; & SU-A-737 879, Suskov, V.M.

Patent Abstracts of Japan, vol. 16, No. 368 (P-1398), 7 Aug. 1992 & JP-A-04 114384 (Matsushita Electric Ind., Co., Ltd.) 15 Apr. 1992.

Patent Abastracts of Japan, vol. 17, No. 45 (P-1476), 28 Jan. 1993 & JP-A-04 258834 (Sony Corp.) 14 Sep. 1992.

*Primary Examiner*—Nabil Hindi

*Attorney, Agent, or Firm*—Limbach & Limbach L.L.P.

[57] ABSTRACT

A recording method for recording an inputted digital signal on a recording medium in which track number data corresponding to the recorded digital signal is recorded by the steps of recording the inputted digital signal on the recording medium and updating the track number data corresponding to the digital signal recorded on the recording medium after an information changing point is detected by detecting at least one of a change of track number in the inputted digital signal, a change of index information, a continuity of reproduction time information, and an existence of audio data in the digital signal.

8 Claims, 14 Drawing Sheets

U.S. PATENT DOCUMENTS

| | | | |
|---|---|---|---|
| 5,337,199 | 8/1994 | Arai et al. | 360/8 |
| 5,343,452 | 8/1994 | Maeda et al. | 369/32 |
| 5,345,433 | 9/1994 | Ohga et al. | 369/54 |
| 5,363,362 | 11/1994 | Maeda et al. | 369/54 |
| 5,377,167 | 12/1994 | Maeda et al. | 369/47 |
| 5,414,688 | 5/1995 | Inokuchi | 369/84 |
| 5,420,838 | 5/1995 | Maeda et al. | 369/48 |
| 5,420,843 | 5/1995 | Yoshida | 369/48 |
| 5,432,768 | 7/1995 | Terashima et al. | 369/48 |
| 5,442,608 | 8/1995 | Umeda et al. | 369/44.27 |
| 5,452,281 | 9/1995 | Otoguro | 369/85 |
| 5,457,667 | 10/1995 | Kojima et al. | 369/32 |
| 5,485,443 | 1/1996 | Niwayama | 369/54 |
| 5,487,047 | 1/1996 | Oka | 369/32 |

| | 16 BIT EVEN M | | 16 BIT ODD M | | |
|---|---|---|---|---|---|
| | MSB WmB LSB | MSB WmA LSB | MSB WmB LSB | MSB WmA LSB | |
| | d1 d8 | d1 d8 | d1 d8 | d1 d8 | |
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | CLUSTER H | CLUSTER L | SECTOR | 00000010 | |
| 4 | 00000000 | 00000000 | 00000000 | 00000000 | DATA AREA (2336 BYTE) |
| 5 | | | | | |
| 6 | | | | | |
| 7 | | | | | |
| ≈ | ≈ | ≈ | ≈ | ≈ | |
| 586 | | | | | |
| 587 | | | | | |

FIG. 2 (PRIOR ART)

TABLE OF CONTENTS
OF SECTOR 0

| | 16 BIT EVEN M | | 16 BIT ODD M | | |
|---|---|---|---|---|---|
| | MSB WmB LSB | MSB WmA LSB | MSB WmB LSB | MSB WmA LSB | |
| | d1 d8 | d1 d8 | d1 d8 | d1 d8 | |
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | CLUSTER H | CLUSTER L | 00000000 | 00000010 | |
| 4 | 00000000 | 00000000 | 00000000 | 00000000 | DATA AREA (2336 BYTE) |
| 5 | 00000000 | 00000000 | 00000000 | 00000000 | |
| 6 | 00000000 | 00000000 | 00000000 | 00000000 | |
| 7 | MAKER CODE | MODEL CODE | FIRST TNO | LAST TNO | |
| 8 | 00000000 | 00000000 | 00000000 | USED SECTORS | |
| 9 | 00000000 | 00000000 | 00000000 | 00000000 | |
| 10 | 00000000 | 00000000 | 00000000 | DISC SERIAL NO | |
| 11 | DISC · ID | | P-DFA | P-EMPTY | |
| 12 | P-FRA | P-TNO 1 | P-TNO 2 | P-TNO 3 | |
| 13 | P-TNO 4 | P-TNO 5 | P-TNO 6 | P-TNO 7 | |
| ≈ | ≈ | ≈ | ≈ | ≈ | |
| 74 | P-TNO 248 | P-TNO 249 | P-TNO 250 | P-TNO 251 | |
| 75 | P-TNO 252 | P-TNO 253 | P-TNO 254 | P-TNO 255 | |
| 76 | 00000000 | 00000000 | 00000000 | 00000000 | |
| 77 | 00000000 | 00000000 | 00000000 | 00000000 | |
| 78 | START ADDRESS | | | TRACK MODE | |
| 79 | END ADDRESS | | | Link-P | |
| ≈ | ≈ | | | ≈ | |
| 586 | START ADDRESS | | | TRACK MODE | |
| 587 | END ADDRESS | | | Link-P | |

FIG. 4 (PRIOR ART)

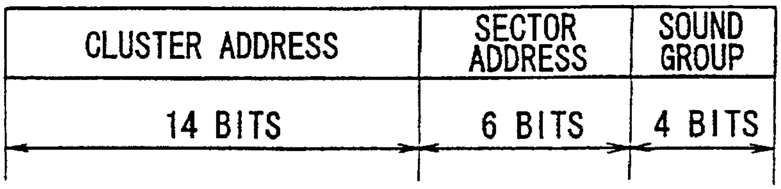
FIG. 5 (PRIOR ART)
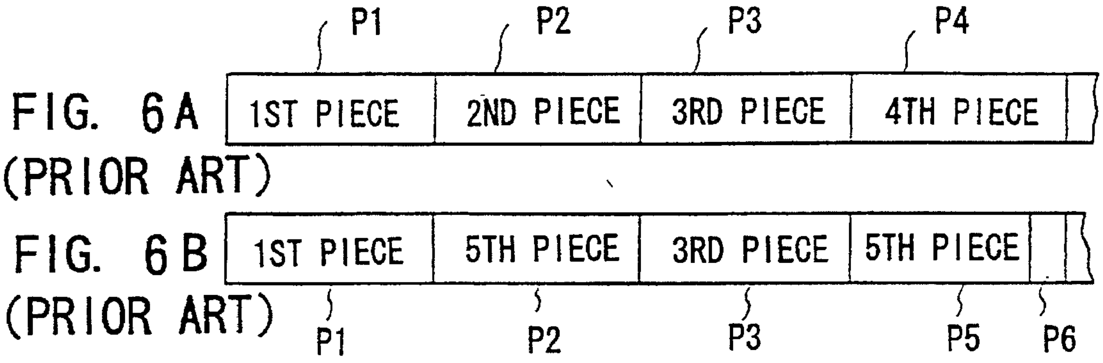
FIG. 6A (PRIOR ART)
FIG. 6B (PRIOR ART)

TABLE OF CONTENTS
OF SECTOR 1

| | MSB WmB LSB | MSB WmA LSB | MSB WmB LSB | MSB WmA LSB | |
|---|---|---|---|---|---|
| | d1 d8 | d1 d8 | d1 d8 | d1 d8 | |
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | CLUSTER H | CLUSTER L | 00000001 | 00000010 | |
| 4 | 00000000 | 00000000 | 00000000 | 00000000 | DATA AREA (2336 BYTE) |
| 5 | 00000000 | 00000000 | 00000000 | 00000000 | |
| 6 | 00000000 | 00000000 | 00000000 | 00000000 | |
| 7 | 00000000 | 00000000 | 00000000 | 00000000 | |
| 8 | 00000000 | 00000000 | 00000000 | 00000000 | |
| 9 | 00000000 | 00000000 | 00000000 | 00000000 | |
| 10 | 00000000 | 00000000 | 00000000 | 00000000 | |
| 11 | 00000000 | 00000000 | 00000000 | P-EMPTY | |
| 12 | 00000000 | P-TNA 1 | P-TNA 2 | P-TNA 3 | |
| 13 | P-TNA 4 | P-TNA 5 | P-TNA 6 | P-TNA 7 | |
| ≈ | ≈ | ≈ | ≈ | ≈ | |
| 74 | P-TNA 248 | P-TNA 249 | P-TNA 250 | P-TNA 251 | |
| 75 | P-TNA 252 | P-TNA 253 | P-TNA 254 | P-TNA 255 | |
| 76 | DISC NAME | | | | |
| 77 | DISC NAME | | | Link-P | |
| 78 | DISC NAME OR TRACK NAME | | | | |
| 79 | DISC NAME OR TRACK NAME | | | Link-P | |
| ≈ | ≈ | | | ≈ | |
| 586 | DISC NAME OR TRACK NAME | | | | |
| 587 | DISC NAME OR TRACK NAME | | | Link-P | |

FIG. 7 (PRIOR ART)

TABLE OF CONTENTS
OF SECTOR 2

| | 16 BIT EVEN M | | 16 BIT ODD M | | |
|---|---|---|---|---|---|
| | MSB WmB LSB | MSB WmA LSB | MSB WmB LSB | MSB WmA LSB | |
| | d1 d8 | d1 d8 | d1 d8 | d1 d8 | |
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | CLUSTER H | CLUSTER L | 00000010 | 00000010 | |
| 4 | 00000000 | 00000000 | 00000000 | 00000000 | DATA AREA (2336 BYTE) |
| 5 | 00000000 | 00000000 | 00000000 | 00000000 | |
| ≈ | ≈ | ≈ | ≈ | ≈ | |
| 11 | 00000000 | 00000000 | 00000000 | P-EMPTY | |
| 12 | 00000000 | P-TRD 1 | P-TRD 2 | P-TRD 3 | |
| 13 | P-TRD 4 | P-TRD 5 | P-TRD 6 | P-TRD 7 | |
| ≈ | ≈ | ≈ | ≈ | ≈ | |
| 74 | P-TRD 248 | P-TRD 249 | P-TRD 250 | P-TRD 251 | |
| 75 | P-TRD 252 | P-TRD 253 | P-TRD 254 | P-TRD 255 | |
| 76 | DISC REC DATE AND TIME | | | | |
| 77 | | | MADER CODE | MODEL CODE | |
| 78 | TRACK REC DATE AND TIME | | | | |
| 79 | | | MADER CODE | MODEL CODE | |
| ≈ | ≈ | | ≈ | ≈ | |
| 84 | TRACK REC DATE AND TIME | | | | |
| 85 | | | | (Link-P) | |
| ≈ | ≈ | | ≈ | ≈ | |
| 586 | TRACK REC DATE AND TIME | | | | |
| 587 | | | | (Link-P) | |

FIG. 8 (PRIOR ART)

TABLE OF CONTENTS
OF SECTOR 4

| | 16 BIT EVEN M | | 16 BIT ODD M | | |
|---|---|---|---|---|---|
| | MSB WmB LSB | MSB WmA LSB | MSB WmB LSB | MSB WmA LSB | |
| | d1 d8 | d1 d8 | d1 d8 | d1 d8 | |
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | CLUSTER H | CLUSTER L | 00000100 | 00000010 | |
| 4 | 00000000 | 00000000 | 00000000 | 00000000 | DATA AREA (2336 BYTE) |
| 5 | 00000000 | 00000000 | 00000000 | 00000000 | |
| 6 | 00000000 | 00000000 | 00000000 | 00000000 | |
| 7 | 00000000 | 00000000 | 00000000 | 00000000 | |
| 8 | 00000000 | 00000000 | 00000000 | 00000000 | |
| 9 | 00000000 | 00000000 | 00000000 | 00000000 | |
| 10 | 00000000 | 00000000 | 00000000 | char. code | |
| 11 | 00000000 | 00000000 | 00000000 | P-EMPTY | |
| 12 | 00000000 | P-TNA 1 | P-TNA 2 | P-TNA 3 | |
| 13 | P-TNA 4 | P-TNA 5 | P-TNA 6 | P-TNA 7 | |
| ≈ | ≈ | ≈ | ≈ | ≈ | |
| 74 | P-TNA 248 | P-TNA 249 | P-TNA 250 | P-TNA 251 | |
| 75 | P-TNA 252 | P-TNA 253 | P-TNA 254 | P-TNA 255 | |
| 76 | DISC NAME | | | | |
| 77 | DISC NAME | | | Link-P | |
| 78 | DISC NAME OR TRACK NAME | | | | |
| 79 | DISC NAME OR TRACK NAME | | | Link-P | |
| ≈ | ≈ | | | ≈ | |
| 586 | DISC NAME OR TRACK NAME | | | | |
| 587 | DISC NAME OR TRACK NAME | | | Link-P | |

FIG. 9 (PRIOR ART)

FIG. 11 A Q DATA QCD

FIG. 11 B Q DATA QMD

| Q DATA | QCB | CTL | Ad | TNO | INDEX | MIN | SEC | FRAME | 00 | AMIN | ASEC | AFRAME | CRC |
|---|---|---|---|---|---|---|---|---|---|---|---|---|---|
| | | | | | | \{LAPSE IN MUSICAL PIECE\} | | | | \{ABSOLUTE TIME\} | | | |

| Q DATA | QMD | 0 | 0 | TNO | INDEX | ALL 0 | CRC |
|---|---|---|---|---|---|---|---|

METHOD OF RECORDING ON A RECORDING MEDIUM EMPLOYING AN AUTOMATIC UPDATING OF MANAGEMENT DATA BY MONITORING THE SIGNAL BEING RECORDED

This is a continuation of application No. 08/465,363 filed on Jun. 5, 1995 which is now abandoned which is a divisional of application No. 08/178,105 filed on Jan. 6, 1994, which was abandoned.

BACKGROUND OF THE INVENTION

1. Field of the Invention

This invention relates to a recording method of recording medium and more particularly, relates to a recording method for recording digital signals supplied with an additional information to a recording medium.

2. Description of the Related Art

There are magneto-optical discs as data rewritable recording mediums of disc type which can record digital data such as computer data. While data is recorded in the magneto-optical disc, a recording film of the magneto-optical disc is heated on one side of the magneto-optical disc to a temperature higher than the Curie point by a light beam emitted from an optical pick up, and at the same time, the vertical magnetic field is supplied to the heated area on the other side of the magneto-optical disc by a magnetic head. As a result, digital data is recorded by magnetizing the recording film of the magneto-optical disc in accordance with the supplying direction of the vertical magnetic field.

The magneto-optical disc is proposed in which analog signals such like sound signals or music information are digitalized to record. A magneto-optical disc recording/reproducing unit using the magneto-optical disc records the digitalized audio data on the magneto-optical disc in predetermined block units. The audio data is recorded in block units so as to be recorded discretely on the magneto-optical disc.

In this magneto-optical disc recording/reproducing unit, audio data to be recorded is sequentially inputted into an volume compressor, in which the audio data thus input is divided into blocks at a predetermined cycle to make them process a volume compression on each block. Such blocks of volume-compressed audio data are hereinafter referred to as sound groups.

A sound group of audio data forms two sectors with eleven continuous blocks and further one cluster with thirty six sectors. Therefore, the recording/reproducing unit records or reproduces the compressed audio data in cluster units based on the sectors.

As shown in a table of FIG. 1, in the magneto-optical disc unit, twenty three hundred and fifty two bytes of data are assigned to each sector, the area represented by longitudinal byte addresses"0" to "3" out of which are allocated to the header of the each sector.

The twelve-byte area represented by longitudinal addresses"0" to "2" is allocated to a synchronization pattern (sync), whereto a formatted synchronization pattern is assigned, and the address of a cluster is allocated to the first and second bytes of the longitudinal address "3".

The respective sectors are continuously formed on a magneto-optical disc every thirty six sectors which are grouped into clusters as addresses for the management of which fourteen-bit addresses are assigned.

The addresses of sectors are also assigned following the address of this clusters and the mode data of the magneto-optical disc is assigned following thereof.

Furthermore, a main data area of twenty three hundreds and thirty six bytes are formed following this header address, to which a user's desired data is assigned.

As shown in FIG. 2, in the magneto-optical disc, data "02h" is recorded as mode data, "00h" of four bytes following a header is recorded subsequently thereof, and audio data is recorded subsequently thereof.

To each sector thus formed is assigned a sound group as shown in FIG. 3.

That is, in an even numbered address sector, the main data area following data "00h" at longitudinal address "4" corresponding to the table shown in FIG. 1 is divided at intervals of longitudinal address "105" into sub-areas which are respectively assigned sequential sound groups of data.

The area at longitudinal address "53" remaining as a result of the above division of the main data area is assigned to the sixth sound group 5, and the area beginning at longitudinal address "5" of a subsequent odd address sector is recorded with the remaining data of the sixth sound group 5.

For this odd address sector in the magneto-optical disc, the remaining area is further divided at intervals of longitudinal address "105" into sub-areas which are respectively assigned the remaining sound groups.

Therefore, in the recording/reproducing unit using a magneto-optical disc of this type, sound groups are formed by processing a volume compression on sequentially input audio data. The sound groups thus formed into sectors are further formed into a cluster, as the unit of which audio data can be recorded in the magneto-optical disc.

In the case where audio data is thus recorded on the magneto-optical disc in cluster units, track-jumped clusters can be re-recorded, for example, even when occurring a track-jump because of vibration during recording operation, by using a mass storage memory circuit as a buffer storage. As a result, continuous audio data can be recorded on a magneto-optical disc without a drop out.

A recording area for recording management data of audio data is formed as a management area on the inner periphery of the magneto-optical disc, whereas a data recording area for recording data of this cluster is formed on the outer area of this management control area.

Therefore, the audio data is sequentially recorded in cluster units into this data recording area.

In contrast, the management data recorded on the management area is used to reproduce desired data out of audio data recorded in cluster on the data recording area.

That is, this management data is defined as data in sector units similar to main data, so that the management data can be standardized with regard to the first to fourth sectors.

The third to fifth sectors "2" to "4" out of the second to fifth sectors "1" to "4" are used for options. As shown in FIG. 4, a cluster address is assigned after a header and subsequently data "00h" is recorded in the first sector, i.e., sector "0".

Moreover, after a predetermined code data (Maker code and Mode 1 code) is assigned in the first sector, other data (First TNO and Last TNO) indicating the recording start position and recording end position of the main data is assigned.

At longitudinal address "11" of this first sector, 2-byte disc identification data can be recorded. The first sector is subsequently assigned a pointer (P-DFA) indicating the position of a defective area in the data recording area and another pointer (P-EMPTY) indicating the initial position of an unrecorded area in the data recording area.

Furthermore, at subsequent longitudinal address "12", the first sector is assigned a pointer (P-FRA) indicating the initial position of the main data recorded in the data recording area and subsequently pointers (P-TN01, . . . , P-TN0255) indicating the recording start positions of respective data items.

Thus, a magneto-optical disc recording/reproducing unit for the record and reproduction of audio signals is enabled to detect the initial positions of recorded music with the aid of these pointers (P-FRA, PTN01, . . . , P-TN0255).

In each area at longitudinal address "76" or less, a start address and an end address are recorded to indicate the recording start position and recording end position, respectively, of the main data, and in pointers (P-FRA, P-TN01, . . . , P-TN0255), the recording positions of these start addresses are pointed.

Thus, the magneto-optical disc recording/reproducing unit is enabled to detect a recording positions regarding musical composition designated by the user through locating the start address and end address pointed to by pointers.

As shown in FIG. 5, at these start address and end address, the address of a cluster is recorded in 14 bits, the address of a sector is recorded in 6 bits, and the address of a sound group is recorded in 4 bits, whereupon the magneto-optical disc recording/reproducing unit is enabled to perform such processes as locating a musical composition by using the units "cluster," "sector," and "sound group," with regard to audio data recorded in cluster units.

In addition, a small recording area on the data recording area designated by such a set of start and end addresses is referred as a part P.

Moreover, in this management data, mode data (Track mode) indicating the processing mode of each part is recorded after this start address. Copy inhibit data, write inhibit data, audio data, stereo data, monaural data, etc. can be distinguished by this mode data, and furthermore it can be recognized by the mode data that whether or not an emphasis process has been performed.

In contrast, in an end address, a link pointer (Link-P) is subsequently recorded to indicate the connection of a part P. The link pointer (Link-P) can designate the recording position of a start address corresponding to this end address.

As shown in FIG. 6A, when an empty magneto-optical disc is recorded with audio data for the first time, the audio data is recorded on the data recording area of the magneto-optical disc in a manner such that the renditions of sequential musical compositions 1, 2, etc., follow each other in succession.

In this case, the respective audio data are recorded on the magneto-optical disc in every part P1, P2, P3, etc., each of which is defined by a set of beginnings and ends addresses.

By contrast, when a musical performance of long musical composition 5 is recorded after the erasure of musical compositions 2 and 4, as shown in FIG. 6B, continuous audio data about this musical composition 5 is divided so as to be recorded in second part P2 and fourth part P4.

In such a case, when the start address of musical composition 5 is specified with a pointer, the performance start position of the second part P2 is detected by the start address, and furthermore, the recording end position of part P2 is detected by an end address forming a pair with the start address.

Moreover, in the magneto-optical disc, a start address is detected when a link pointer (Link-P) following this end address is specified similarly to the pointers (P-FRA, P-TN01, . . . , P-TN0255) of fourth part P4. Thus, the magneto-optical disc can record audio data by the effective-use of the data recording area of the magneto-optical disc by rewriting this management area data every time when recording or erasing operation is repeated.

The pointers (P-FRA, P-TN01, . . . , P-TN0255) are formed in correspondence to the respective audio data recorded on the magneto-optical disc, and the corresponding parts P are specified respectively together with link pointers.

In contrast, when musical composition 2 has been erased from the audio data recorded continuously, the magneto-optical disc recording/reproducing unit designates the erased area with a pointer (P-EMPTY) pointing to the initial position of an unrecorded area in the data recording area.

The pointer (P-EMPTY), similar to the other pointers (P-FRA, P-TN01, . . . , P-TN0255), is designed so as to designate the start address of a corresponding part P, whereby the magneto-optical disc recording/reproducing unit replaces the designation of parts P2 and P4 previously pointed to by pointers (P-TN01, P-TN02, . . . ) with the designation of a pointer (P-EMPTY) pointing to the initial position of the unrecorded area and the link pointer (Link-P) of an end address forming a pair with the start address pointed to by this pointer. Thus, audio data can be erased from the magneto-optical disc easily.

Thus, in the magneto-optical disc unit, the audio data between clusters designated by the start address and end address is reproduced in cluster units. Thereafter, the audio data, which is designated by a sound group address corresponding to an start address and an end address, is reproduced by processing the data in sector units. Therefore, the audio data recorded discretely on a magneto-optical disc can be reproduced easily.

At this time, in the magneto-optical disc recording/reproducing unit, the audio data is recorded in cluster units as described above and the audio data is reproduced in cluster units. This enables to prevent the reproducing sounds from skipping by reproducing track-jumped clusters, if any, by using a mass storage memory circuit as buffer storage.

In this connection, of the remaining management data sectors, in the second sector, sector 1, as shown in FIG. 7, a disc name and a track name are assigned in ASCII code in correspondence to a start address and an end address after a header and pointers (P-TN01, P-TN02, . . . ) are recorded similarly to the first sector.

By contrast, in the third sector of the management data, sector 2, as shown in FIG. 8, pointers (P-TRD1, P-TRD2, . . . ) are recorded in correspondence to the pointers (P-TN01, P-TN02, . . . ) of the first sector after a header, etc., are recorded similarly to the first sector.

Therefore, in the third sector, sector 2, recording time (Track rec data and time), etc., can be record by pointers (P-TRD1, P-TRD2, . . . ), with regard to respective audio data corresponding to the pointers (P-TN01, P-TN02, . . . ) of the first sector.

Furthermore, in the fifth sector of the management data, sector 4, as shown in FIG. 9, pointers (P-TNA1, P-TNA2, . . . ) are formed similarly and a disc name and a track name can be recorded in Japanese kanji code.

Thus, such magneto-optical disc recording/reproducing unit is connected to some audio equipment, such as an analog tape player, LP record player, or compact disc player, as a source of audio information. The analog audio signal output from these audio equipments is converted into digital audio signal, and audio data is recorded. Otherwise, the magneto-optical disc recording/reproducing unit is connected to some digital audio equipment, such as a compact disc player, digital audio tape recorder, or magneto-optical disc recording/reproducing unit. The digital audio signal output from these digital audio equipment is recorded.

When audio signals supplied from various sources are recorded on the magneto-optical disc recording/reproducing unit described above, tracks are controlled by automatically giving track numbers (musical composition number), which are also given in musical units in a compact disc, for example, for the musical compositions recorded on the magneto-optical disc. To perform such track number control, it is necessary to detect changing of musical compositions with respect to the analog or digital audio signals supplied.

Especially in cases where digital data of input signals are supplied from, for example, a compact disc player, their sub-code data is also sent at the same time with digital data. Therefore, if the track number information of sub-code data is fetched as it is, the track number control and updating numbers with respect to the musical compositions recorded in the magneto-optical disc can be easily performed.

However, there are proper cases where a user reproduces a desired track by searching for musical compositions which are recorded in a disc of a compact disc player, for example, that is, a search operation (access operation) for performing program reproduction so as to play musical compositions in a desired order is carried out during the reproducing operation. In this case, the excessive change of the sub-code data occurs due to the extraction of the sub-code data of another track in access or the detection of incorrect data. At this time, in the magneto-optical disc recording/reproducing unit, a problem occurs that wrong track numbers are given to the recorded musical compositions because track numbers are updated in accordance with the track number information in the sub-code data on the recording apparatus side.

As described above, in compact disc players, for example, the programmed reproduction mode is set so that musical compositions recorded in a compact disc can be reproduced in a user's desired order.

Accordingly, a magneto-optical disc recording/reproducing unit is enabled to record audio data in the magneto-optical disc in a user's desired order, dispensing with the otherwise necessary recording/reproducing operations for each end of reproduction of musical compositions, by connecting to a piece of audio equipment set in its programmed reproduction mode and being put in its recording mode. That is, if once a piece of audio equipment and a magneto-optical disc recording/reproducing unit are connected and the reproducing or recording operation is set, it is possible to omit the otherwise necessary operations to be carried out until the end of recording. This recording method is hereinafter referred as automatic recording.

However, there may be some compact discs which have been recorded with only enough music data for a musical performance time of some thirty minutes.

Accordingly, if a magneto-optical disc capable of recording for, for example, sixty minutes is loaded onto a magneto-optical disc recording/reproducing unit, and audio data to be reproduced from this compact disc is automatically recorded, a mute will record for no less than thirty minutes in the magneto-optical disc after the musical performance on the part of the compact disc player terminates.

To prevent from recording this mute to the magneto-optical disc, the user needs to perform a stop operation on the magneto-optical disc unit when the reproduction of a compact disc terminates. As a result, even when this automatic recording mode a user's manipulation is actually required, thereby there are some problems to be solved for practical use.

SUMMARY OF THE INVENTION

In view of the foregoing, an object of this invention is to provide a recording method of recording medium.

The foregoing object and other objects of the invention have been achieved by the provision of a recording method of a recording medium as described below.

According to this invention, a recording method of recording medium for recording the inputted digital signals to a recording medium is proposed, in which management data corresponding to the recorded digital signal is recorded in a recording medium, and such a recording method is performed as follows: The inputted digital signals are recorded on a recording medium, and at the same time, it is detected that whether the information change point of digital signals are detected or not based on an additional information of the inputted digital signals. Then, after the information change point is detected, it is performed the updating operation for updating management data corresponding to the digital signals recorded in the recording medium.

According to this invention, a recording method of a recording medium for recording the inputted digital signals to the recording medium is proposed, in which the inputted digital signals are outputted from a signal source recorded with sub-code data, and the area where the management data is recorded is formed in the recording medium. Such a recording method is performed as follows: The end point of the inputted digital signals is detected on the basis of whether the reproduction passage time information of sub-code data supplied with the inputted digital signals changes or not. After the reproduction passage time information becomes not to change, and the end point of the inputted digital signals is detected, it is detected whether the audio data is included in the inputted digital signals. When it is detected that the audio data is not included in the inputted digital signals, the waiting state for recording the specific time is set. In the case where it is detected that the reproduction passage time information becomes not to change and the audio data is not included in the inputted digital signals after passing the specific time, the recording operation of data to the recording medium terminates. Moreover, the time, that the specific time has past from the time of which the reproduction passage time information becomes not to change and the end point of the inputted digital signals is detected, is recorded as a recording end point in the area of the recording medium in which the management data is recorded, thereafter, the whole recording operation terminates.

According to this invention, a recording method of a recording medium for recording the inputted digital signals to the recording medium is proposed, in which the inputted digital signals are outputted from a signal source recorded with sub-code data, and the area where the management data is recorded is formed in the recording medium. Such a recording method is performed as follows: The recording operation is controlled regarding pause state and recording state based on the index data of sub-code data supplied with the inputted digital signals. It is detected that the index data is the last index data, thereafter, the waiting state for recording the specific time is set. After passing the specific time, the recording operation of data to the recording medium terminates. Moreover, the time, that the specific time has past from the time of which it is detected that the index data is the last index data, is recorded as a recording end point in the area of the recording medium in which the management data is recorded, thereafter, the whole recording operation terminates.

According to this invention, a recording method of a recording medium is proposed, in which the N-th digital signals (N is a natural number) supplied with an additional information are converted into recording data composed of a plurality of sectors so as to be recorded in the recording medium, and the recording medium has a data recording area for recording the recording data and a management area in which the management data of recording data is recorded. Such a recording method is performed as follows: The recording mode is set to initiate the recording operation, and at the same time, the recording start point in the data recording area of the recording medium is set on the basis of the management data recorded in the management are of the recording medium. The observation of the additional information which is supplied with the inputted digital signals is started from the time that the specific time has past after the recording start point is set. It is detected whether the inputted digital signal is (N+1)-th signal or not based on the index information in the additional information. The one preceding sector from the time that the (N+1)-th digital signal is detected is set as a recording end point, thereafter, the recording operation terminates. Then, the recording start point and the recording end point which are set are recorded in the management area.

According to this invention, a recording method of a recording medium In which the inputted analog signals are converted into the digital signals to record the recording medium. Such recording method is performed as follows: The signal level of the analog signals to be inputted is detected. Then, the recording operation to the recording medium is stopped at the time of detection of which the signal level of the inputted analog signals, during specific period from the time of detection of which the detected signal level of the analog signal becomes lower than the specific signal level.

According to this invention, the change point of audio data is detected by using, at least, one of the additional information, which are supplied with the digital signals, such a track number information in sub-code, an index information or a reproduction passage time information of audio data, so that the process for updating track number recorded in the recording medium is correctly performed. Moreover, the update processing can be performed correctly by using the detection of existence of voice data in audio data.

According to this invention, in accordance with the continuity of the reproduction passage time information, the existence of voice data in signals, or the index information, it is judged whether the input of digital signals terminates or not. The recording operation of the recording/reproducing unit of recording medium is arranged to stop on the basis of the judgement result. Therefore, this enables to automatically terminate the recording operation without user's operation of unit, and further, enables to record in the recording medium without a waste mute portion.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2 is a chart showing the format of the conventional magneto-optical disc in the case where the recording data is audio data;

FIG. 4 is a chart for the explanation of the TOC of sector 0 in the conventional magneto-optical disc;

FIG. 5 is a schematic diagram for the explanation of a start address and an end address in the conventional magneto-optical disc;

FIGS. 6A and 6B are schematic diagrams for the explanation of parts in the conventional magneto-optical disc, FIG. 6A being a diagrams for the explanation of the recording operation in case where no data is recorded in the conventional magneto-optical disc, and FIG. 6B being a diagram for the explanation of the recording operation in case where data is recorded again after data recorded in the conventional magneto-optical disc is erased once;

FIG. 7 is a chart for the explanation of the TOC of sector 1 in the conventional magneto-optical disc;

FIG. 8 is a chart for the explanation of the TOC of sector 2 in the conventional magneto-optical disc;

FIG. 9 is a chart for the explanation of the TOC of sector 4 in the conventional magneto-optical disc;

DESCRIPTION OF THE INVENTION

Figure 1:
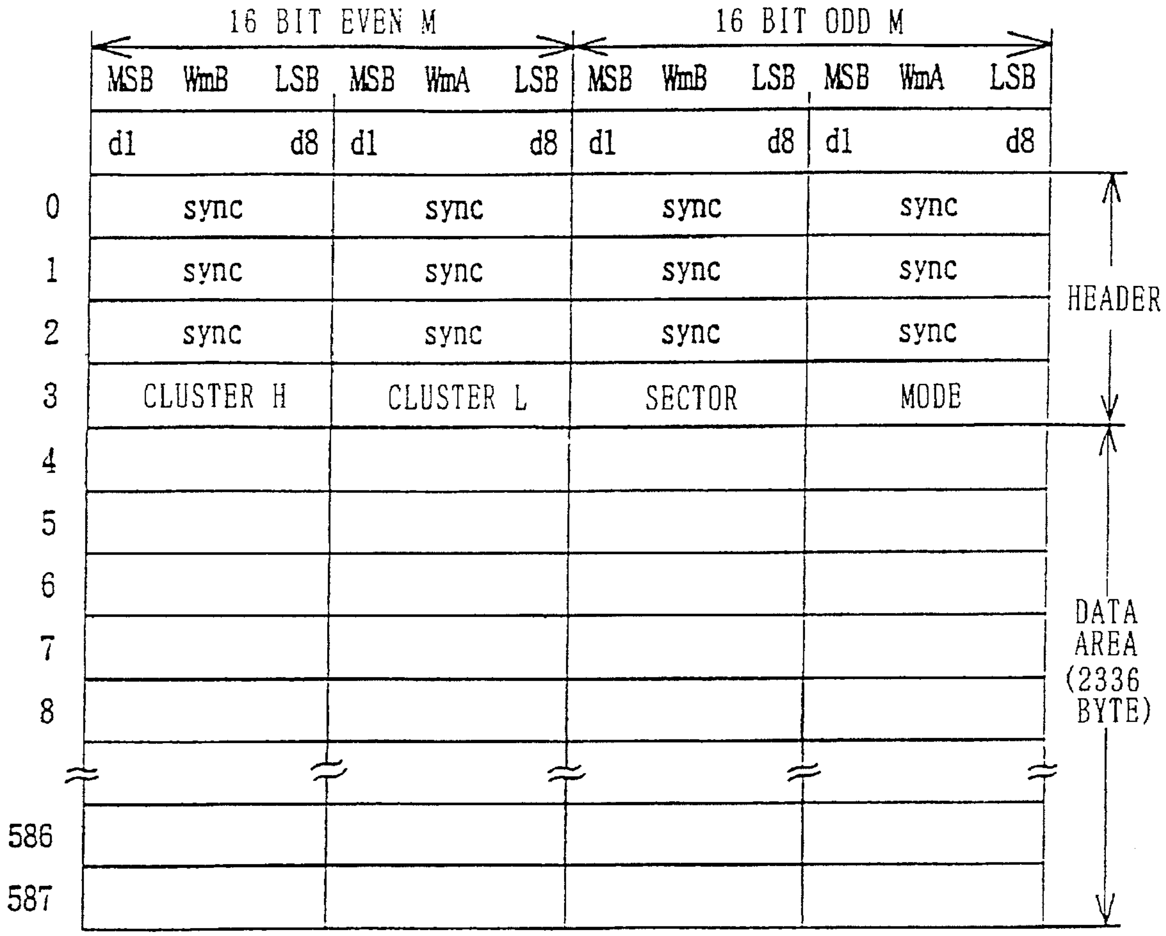
FIG. 1 is a chart showing the recording format in the conventional magneto-optical disc.
Figure 3:
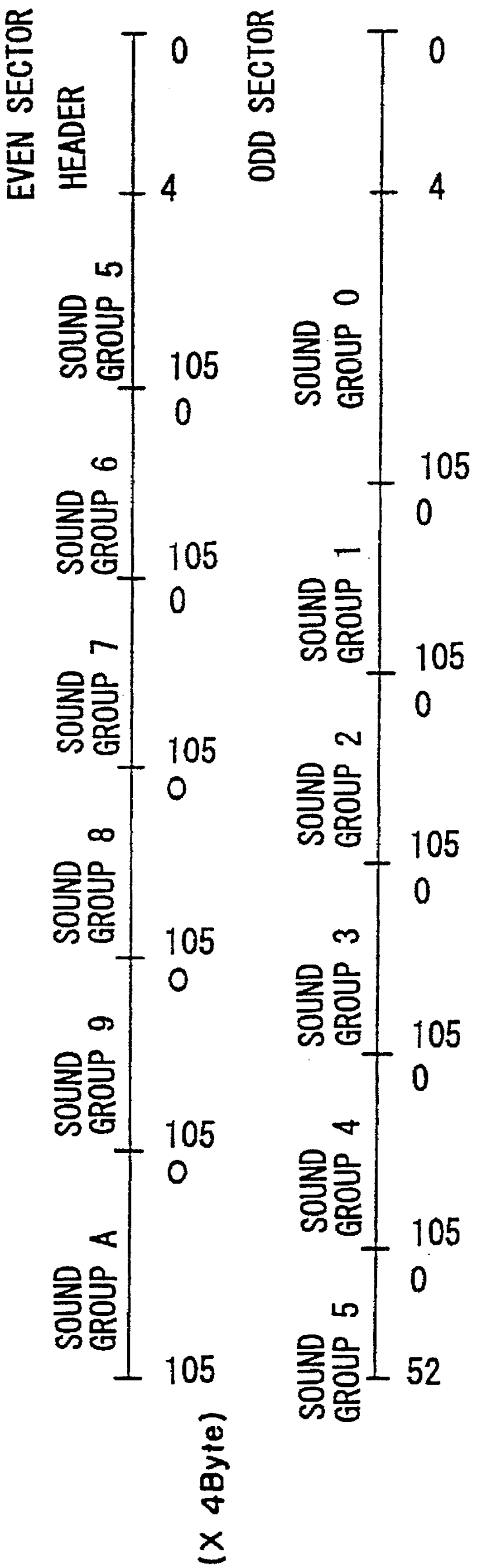
FIG. 3 is a schematic diagram for the explanation of sound groups of the recording format in the conventional magneto-optical disc.
Figure 10:
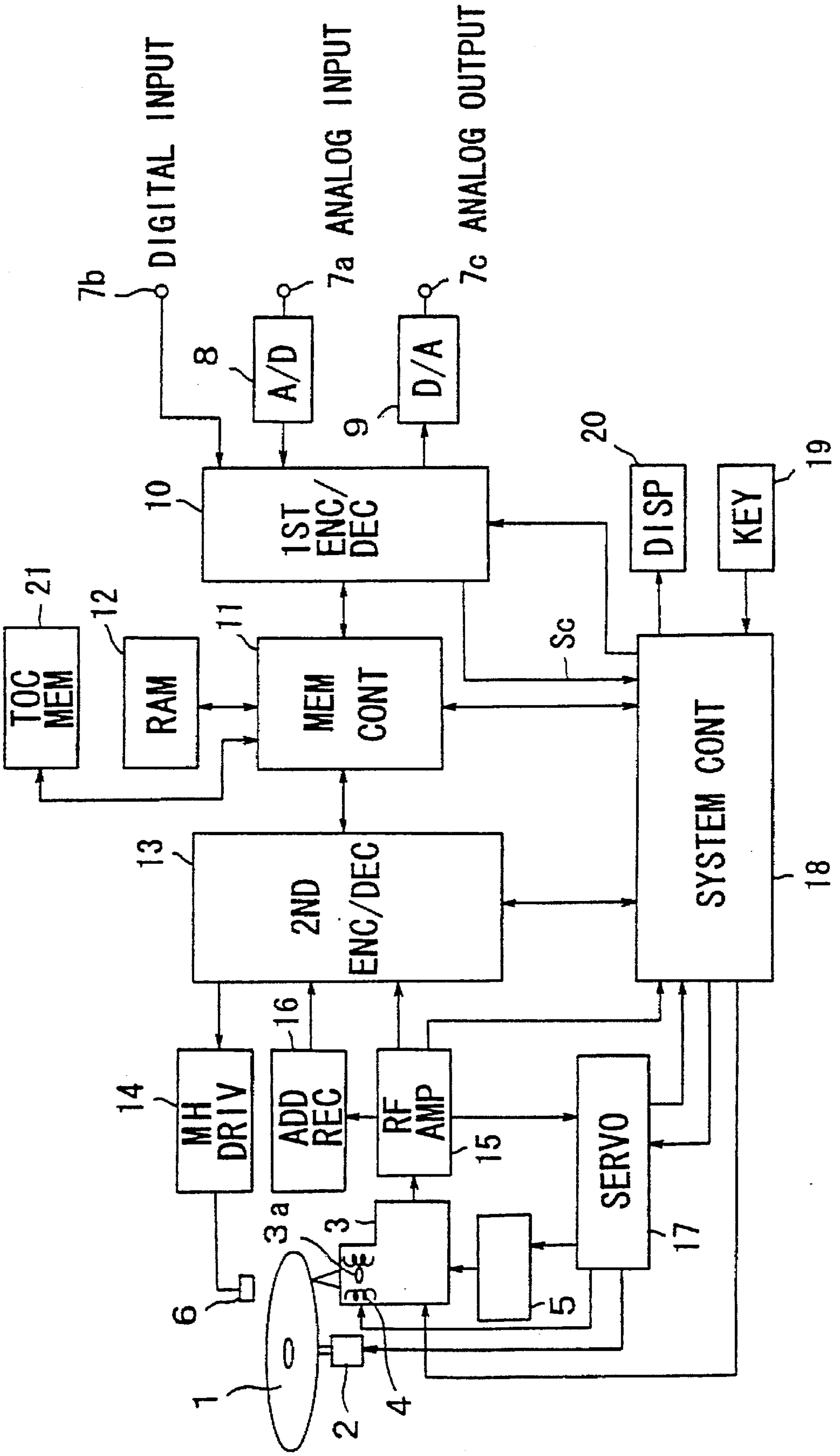
FIG. 10 is a block diagram of a recording/reproducing unit according to the present invention.

Preferred embodiments of this invention will be described with reference to the accompanying drawings:

In this embodiments, an unit for recording and reproducing voice signals on a magneto-optical disc is explained by using a magneto-optical disc as a recording medium. The block diagram is shown in FIG. 10.

A numeral 1 shows a magneto-optical disc which is housed in a disc cartridge which is not shown in figure. In the disc cartridge, a pair of aperture portions (not shown) are formed at the facing position on the upper and lower surfaces of the disc cartridge body. The recording or reproducing operation is performed for the magneto-optical disc 1 housed through the aperture portion. Also, a shutter for opening and shutting a pair of aperture portions is movably set on the disc cartridge body. When the disc cartridge is set in the recording/reproducing unit, the shutter is moved to the direction to open a pair of aperture portion, and when the disc cartridge is taken out from the recording apparatus, the shutter is moved to the direction to shut a pair of aperture portion.

The magneto-optical disc is composed of a disc substrate, a recording film, and a protection film. The disc substrate is made up of such materials having light permeability as polycarbonate and PMMA. Pregrooves which wobble toward the diameter of the magneto-optical disc on the basis of address data is formed on the disc substrate. In the recording film, such magneto-optical recording materials as terbium (Tb), iron (Fe), and cobalt (Co) are vacuum evaporated on the surface on which the pregroove of disc substrate is formed, and are formed to a thin film state by the method like a spattering. The protection film is formed on the recording film to protect the recording film by using an ultraviolet curing resin. The magneto-optical disc 1 has a data recording area and a management area in which management information is recorded. Data is recorded in the data recording area along the pregroove discretely or continuously. Data is intermittently recorded/read in/from the data recording area of the magneto-optical disc 1 for every cluster. One cluster consists of thirty two sectors in which data is actually recorded and four linking sectors. Three sectors of the head among four linking sectors prevent from the interference of interleave of CIRC being in data between the neighboring clusters. The rest one sector following this four sectors is for sub-data. One sector further consists of a plurality of sound groups, and a pair of two sectors consists of eleven sound groups. In this embodiment, One sector is twenty three hundred and fifty two [byte] and twenty three hundred and thirty two [byte] of one sector is for data. One sound group is 424 [byte]. Moreover, one sound group is 512 samples of audio signals which are for right channel and left channel, and this corresponds to 11.61 [msec] in reproducing time. As shown in FIGS. 4, 7, 8 and 9, the title information regarding data recorded in the data area or regarding program, address information such as a start address and an end address of each data or program, and information representing the connecting relation between each small recording area and parts P, are recorded in the management area. After the magneto-optical disc 1 is set in the recording/reproducing unit, the management area is read by an optical pick up described later, before recording or reproducing data into the data recording area, and then the data which is read from the recording area is stored in a memory described later. The start address and end address recorded in the management area consist of twenty four [bit] data respectively. The cluster number is represented by the upper fourteen [bit], the sector number is represented by the following six [bit], and the sound group number is represented by the lower four [bit]. In accordance with this, the pregroove which is formed in the magneto-optical disc 1 wobbles toward the diameter direction of disc, based on the signals modulated on the basis of the address data including each address data of cluster and sector. The signals which are read from this pregroove is demodulated so as to confirm and manage the recording position or the reproducing position at the recording or reproducing operation by a system controller 18.

The numeral 2 shows a spindle motor, which drives to rotate the magneto-optical disc 1 at constant linear velocity (CLV). A turn table (not shown) is provided at the top of the rotating axis of the spindle motor 2. The magneto-optical disc 1 in the disc cartridge set in the recording/reproducing unit is placed on the turn table.

The numeral 3 shows an optical pick up having a object lens 3*a*. The optical pick up 3 has a laser light source, an optical system, such as a beam splitter, which separates the light beam emitted from the light source and the returning light beam reflected from the magneto-optical disc 1, and a light detector for receiving the returning light beam separated by the beam splitter. The object lens 3*a* focuses the light beam emitted from the light source of the optical pick up 3 onto the recording film via one of the aperture portion of the disc cartridge of the magneto-optical disc 1. The optical pick up 3 includes an actuator 4 for driving the object lens 3*a* toward the focusing and tracking direction. The actuator 4 consists of electromagnetic actuators, and focusing servo signals and tracking servo signals are supplied from a servo control circuit 17. As a result, the object lens 3*a* is driven to the focusing direction and the tracking direction in order that the focusing error signals and tracking error signals become to"0" respectively, and in this way the focusing servo and tracking servo are performed.

The numeral 5 shows a feed mechanism, which is composed of a guide portion for guiding the optical pick up 3 to the direction of diameter of the magneto-optical disc 1, and a feed mechanism unit having a motor for generating the driving power to feed the optical pick up 3 to the direction of diameter of the magneto-optical disc 1. The feed mechanism 5 feeds the optical pick up 3 to the direction of diameter of the magneto-optical disc 1 based on the feed signals supplied from the servo control circuit 17. As described above, when the optical pick up 3 is fed to the direction of diameter of the magneto-optical disc 1, a magnetic head described later is also fed to the direction of diameter of the magneto-optical disc 1.

The numeral 6 shows a magnetic head, which faces to the protection film side of the magneto-optical disc 1 through the other side of aperture portion of the disc cartridge. The magnetic head 6 is placed at the position facing the optical pick up 3 across the magneto-optical disc 1. The magnetic head 6 generates the vertical magnetic field corresponding to the recording data based on the driving signals supplied from a magnetic head driving circuit 14. The generated vertical magnetic field is supplied to the recording film from the protection film side of the magneto-optical disc 1. The magnetic head 6 is mechanically connected with the optical pick up 3, and if the optical pick up 3 moves to the direction of diameter of the magneto-optical disc 1 by the feed mechanism, the magnetic head 6 also moves to the direction of diameter of the magneto-optical disc 1.

The numeral 8 shows an A/D (analog to digital) converter, which digitalizes input signals supplied from the analog input terminal 7*a*, for example, analog audio signals by the sampling frequency 44.1 [kHz] and the quantization bit size 16 [bit]. In FIG. 10, the analog audio signals inputted from the analog input terminal 7*a* is shown as one channel to simplify, however, these are actually two channels composed of "L" and "R" stereo signals. It will be shown below in a similar way.

The numeral 9 shows a D/A (digital to analog) converter, which performs the opposite process to the A/D converter 8 for the digital audio signals outputted from a first encoder/decoder described later, and supplies the converted signals to an analog output terminal 7*c* as an analog audio signals.

The numeral 10 shows the first encoder/decoder, in which the digital signals outputted from the A/D converter 8, are supplied in recording, and the digital data read from a buffer memory 12 are supplied in reproducing. In the first encoder/decoder 10, the digital audio signals supplied from the A/D converter 8 are compressed to about ⅕. In this case, in the first encoder/decoder 10, a modified DCT (modified discrete cosine transform) is used as a compressing technique in recording , and a data expansion process is also performed to the digital data supplied from the buffer memory in reproducing.

The digital data outputted from the first encoder/decoder 10 are temporarily stored via a memory controller 11 in the buffer memory 12 which is composed of DRAM (dynamic random access memory) the memory capacity of which is 4 [Mbit]. The memory controller 11 controls writing and reading the data to the buffer memory 12. In recording to the magneto-optical disc 1, the digital data outputted from the first encoder/decoder 10 is written in the buffer memory 12 at a transfer rate of 0.3 [Mbit/sec], and the data stored in the buffer memory 12 is read therefrom at a transfer rate of 1.41 [Mbit/sec]. In reproducing the magneto-optical disc 1, the digital data outputted from a second encoder/decoder described later is written in the memory 12 at a transfer rate of 1.41 [Mbit/sec], and the data stored in the memory 12 is read therefrom at a transfer rate of 0.3 [Mbit/sec].

The memory controller 11, in recording, sequentially reads out the compressed digital data outputted from the memory 12 at a five times faster transfer rate than the data writing rate thereto at which the compressed digital data is output from the first encoder/decoder 10, when there is no track jump which is occurred due to the disturbance such as vibration, so that the recording position on the magneto-optical disc 1 jumps to other position or other track. The digital data read from the memory 12 are supplied to the second encoder/decoder 13.

When the detection signals representative of the occurrence of track jump while recording to the magneto-optical disc 1 is supplied to the system controller 18 described later, the memory controller 11 stops to transfer the digital data to the second encoder/decoder, and stores the compressed digital data from the first encoder/decoder 10 in the memory 12. Then, after the irradiated position of the light beam, i.e. the recording position, irradiated from the optical pick up 3 to the magneto-optical disc 1 is corrected, the memory controller 11 controls the data writing and reading for the memory 12 such as to resume the conversion of the digital data to the second encoder/decoder 13 from the memory 12. The recording position is corrected on the basis of the address data of the magneto-optical disc 1.

The occurrence of track jump is detected, for example, by judging whether the vibration is detected or not by the vibrometer which is provided in the recording/reproducing unit so that the vibration is inclined to cause the track jump, by the system controller 18. Also, as described above, since the address data is recorded on the pregroove in the magneto-optical disc 1, the address data is read in recording, and the continuity of the decoded address data outputted from an address decoder described later is observed by the system controller 18. Thus, the track jump can be detected. Further, the track jump can be detected by OR operation (logical add) between the detected signals of the vibrometer and the signals in which the continuity of the decoded address data is detected. When the track jump is detected, the optical pick up 3 is controlled by the system controller, in order to lower the output level of the light beam, which is irradiated from the optical pick up 3 to the magneto-optical disc 1, to the unrecordable level, or in order to set the output level to "0".

In the above case, it needs the memory capacity of the memory 12, at least the quantity of which corresponds to the digital data generated during the period from the occurrence of track jump to the time at which the control signals is supplied from the system controller to the optical pick up 3 to correct the recording position. In this embodiments, four [Mbit] DRAM is used as the memory 12, the memory capacity of which satisfies the above condition.

The memory controller 11 controls the writing and reading of data in the memory 12 in order to reduce the data stored thereof, while the correct recording operation is performed in recording. More specifically, if the data size in the memory 12 exceeds the predetermined size, the data of specific size, for example the data for one cluster, is read from the memory 12 so as to keep the storable area having the data size more than the predetermined size in the memory 12 all the time.

In this way, the digital data read out from the memory 12 is supplied to the second encoder/decoder 13. In the second encoder/decoder 13, the supplied digital data is performed the encoding process for error detection correcting, and the decoding process which is suitable for recording. In this embodiments, the EFM (8–14 decoding) process is performed. The code, that the interleave is changed regarding CIRC (cross interleave reed-solomon code) of the compact disc (CD), is used for the code for error detection correcting.

The recording data outputted from the second encoder/decoder 13 is supplied to a magnetic head driving circuit 14. The magnetic head driving circuit 14 generates the driving signals for the magnetic head 6 based on the recording data, and supplies the driving signals to the magnetic head 6.

The output signals from the light detector of the optical pick up 3 is supplied to a RF amplifier. The RF amplifier 15 generates the RF signals as a reading signals of the magneto-optical disc 1 based on the output signals from the light detector of the optical pick up 3. In this embodiments, since the magneto-optical disc is used as a recording medium, the RF signals is outputted from the RF amplifier 15 based on the difference of the Kerr rotating angle of the light beam reflected on the recording film of the magneto-optical disc. The RF signal is supplied to the second encoder/decoder 13. Further, the RF amplifier 15 generates a focusing error signals from output signals outputted from the light detector on the basis of the astigmatism method. The RF amplifier 15 generates tracking error signals based on the output signals outputted from the light detector by the three spot method. The RF amplifier 15 generates a push-pull signals which represents the detection result of the wobbling pregroobe, based on the output signals outputted from the light detector by the push-pull method, and supplies it to the address decoder. The astigmatism method is disclosed, for example, in U.S. Pat. No. 4,023,033. The three spot method is disclosed, for example, in U.S Pat. No. 3,876,842. The push-pull method is disclosed, for example, in U.S. Pat. No. 3,909,608. The focusing error signals and tracking error signals generated by the RF amplifier 15 are supplied to the servo control circuit 17. The RF amplifier 15 supplies the generated RF signals to the servo control circuit to generate a spindle servo signals.

The push-pull signals generated by the RF amplifier 15 is supplied to the address decoder 16. The address decoder 15 outputs the address data obtained by FM demodulating the supplied push-pull signals. The address data outputted from the address decoder 16 is supplied to the second encoder/decoder 13 to allow to perform the decoding processing. The decoded address information is supplied to the system controller 18 and is used by the system controller 18 for the confirmation of recording position in recording or the confirmation of reproducing position in reproducing, and for position control. The synchronization signals extracted from the address data decoded by the address decoder 16, are supplied to the servo control circuit to generate the spindle servo signals.

The focussing error signals, the tracking error signals, and the RF signals, or the synchronization signals extracted from the address data is supplied from the RF amplifier to a servo control circuit 17. The servo control circuit 17 generates the focussing servo signals, the tracking servo signals, and the spindle servo signals based on the supplied signals. The focussing servo signals and the tracking servo signals are supplied to the actuator 4 of the optical pick up 3, and the focussing servo and the tracking servo is performed as described above. The spindle servo signals are generated based on the either of the RF signals or the synchronization signals extracted from the address data. The spindle servo signals are supplied to a spindle motor 2, and controls the spindle motor in order that the magneto-optical disc 1 rotates at the constant linear rate (CLV). Further, the servo control circuit 17 generates the feed signals. The feed signals is generated based on the low frequency components of the tracking error signals. The feed signals are supplied to the motor of the feed mechanism 5, which feeds the optical pick up 3 and the magnetic head 6 to the direction of diameter of the magneto-optical disc 1, such as to match the recording track along the running of the light beam of the optical pick up 3. The servo control circuit 17 generates access signals based on access command sent from the system controller 18, and supplies to the feed mechanism 5. In this case, the access signals are supplied to the feed mechanism 5, and moves the optical pick up 3 and the magnetic head 6 to the direction of diameter of the magneto-optical disc 1 by the distance corresponding to the access command.

The system controller 18 is composed of micro computer. On input part 19 and a display part 20 are connected to the system controller 18. Further, the clock detected signals of PLL circuit which occurs bit clock of the recording or reproducing operation, the reproduced data, and the monitor signals of the lacking state of the frame synchronization signals of L-, R-channel, are also supplied. The system controller 18 generates various control signals for executing the operation such as start, stop, and access of recording or reproducing, based on the input signals inputted from the input part 19, and controls the operation in the parts of the recording/reproducing unit such as the servo control circuit 17, the second encoder/decoder 13, and the memory controller 11, and controls the operation, all over the recording/reproducing unit. The output level of the light beam irradiated from the optical pick up 3 is controlled by the control signals supplied from the controller 18. The output level of the light beam, which is irradiated from the optical pick up 3 in recording, is enough output level to record, and as described above, if the system controller 18 confirms the occurrence of the track jump, the output level is immediately lowered to the unrecordable output level, for example, the output level in reproducing.

The input part 19 is provided in the front panel of the unit body, and has a plurality of keys such as a power source key for on/off switching the power source of the unit, a reproducing key for starting the reproducing operation, a recording key for starting the recording operation, a stop key for stopping the recording or reproducing operation, and a key for executing the access.

The display part 20 is provided in the front panel of the unit body, and is composed of a display element such like a liquid crystal display or a fluorescent display tube. The display control signals, which are generated in the system controller 19 based on the data recorded in the management area of the magneto-optical disc 1, are supplied to the display part 20. According to this display control signals, the time information such as the total reproducing time of the magneto-optical disc 1, the reproducing passage time of data or program in reproducing, the rest time of data or program in reproducing, or the recordable rest time, and the track number in reproducing or recording, are displayed in the display part 20. Further, if the title of disc itself, the title information of each data or program, or the data regarding the recording date of data or program, are recorded in the magneto-optical disc 1, these are displayed in the display part 20 selectively.

A memory 21 stores the data recorded in the management area of the magneto-optical disc 1, and is hereinafter referred to as a TOC memory. After the disc cartridge is set in the recording/reproducing unit, the optical pick up 3 is fed to the inner position of the magneto-optical disc 1, and the data recorded in the management area of the magneto-optical disc 1 is read out by the optical pick up 3, in accordance with the control signals from the system controller 18, before the recording data is recorded to the magneto-optical disc 1, or the data recorded in the magneto-optical disc is read out. The data, which is read out by the optical pick up 3 and is recorded in the management area, is stored in the TOC memory 21. The system controller 18 controls the recording or reproducing operation of the recording/reproducing unit by using the data recorded in the management area stored in the TOC memory 21.

In the recording/reproducing unit according to this invention, audio signals from a compact disc player, tape player, or some other magneto-optical recording/reproducing unit using the same recording format with the magneto-optical disc according to this invention are supplied to an analog input terminal *7a* or a digital input terminal *7b*, when data is recorded onto the magneto-optical disc 1.

The recording signal which is supplied to the analog input terminal *7a*, for example, an analog audio signal is converted into digital data by an A/D converter 8, which digital data is then supplied to the first encoder/decoder 10, therein to undergo an audio compression decoding process.

On the other hand, audio information reproduced on an external compact disc player or the other same magneto-optical disc recording/reproducing unit is supplied to the digital terminal *7b* in the form of digital data. The digital data is then supplied as recording data to the first encoder/decoder 10. This digital data includes control data such as sub-code information, as well as audio information.

When digital data is inputted from the digital input terminal *7b*, the first encoder/decoder 10 extracts control data Sc from the digital data and supplies the control data Sc thus extracted to the system controller 18 for the management of musical compositions to be recorded.

As well known digital data to be input to the terminal *7b* from a compact disk player, for example, there are U bit data, C bit data, V bit data as control data, as well as audio data.

U bit data includes sub-code data formed of P, Q, R, S, T, U, V, and W data, whereas C bit data includes category data, sampling frequency data, clock data, optical system data, etc., which are used for the discrimination of recording media. Also, V bit data includes error flags, etc..

The system controller 18 manages various recording operations by using necessary data selected from among these items of control data Sc, and updates the track number of data being recorded on the basis of Q data of U bit data, as will be described later. Also, the system controller 18 is designed so as to discriminate a source of data input by using V bit data.

Figures 11A, 11B:
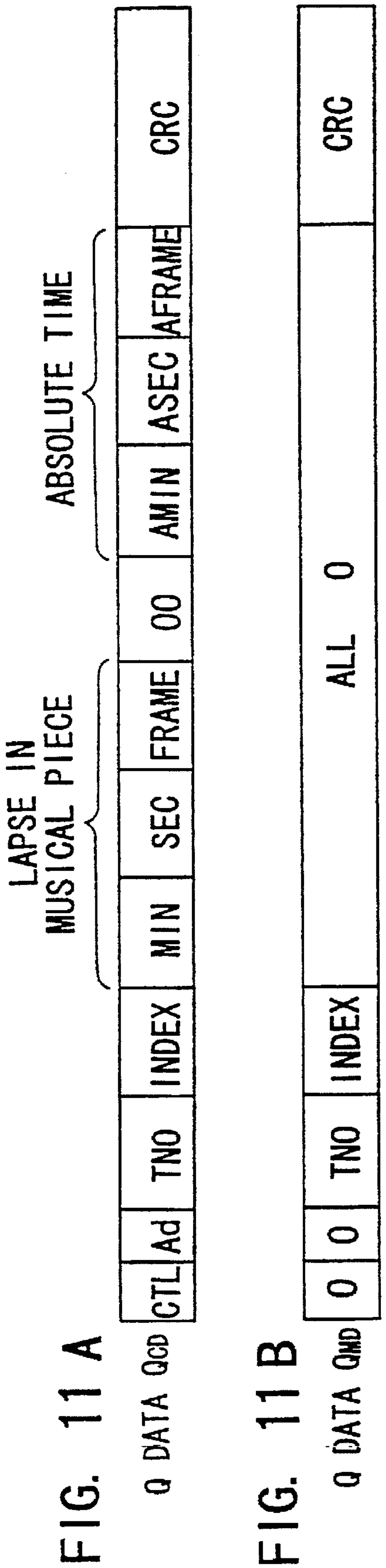
FIGS. 11A and 11B are diagrams for the explanation of the constitution of the Q data, FIG. 11A being a diagram explaining the Q data of a compact disc and FIG. 11B being a diagram explaining the Q data of a magneto-optical disc according to the present invention.

The structure of Q data depends on each recording medium. FIG. 11A shows the Q data $Q_{CD}$ structure of a compact disc. FIG. 11B shows the structure of the Q data $Q_{MD}$ of the magneto-optical disc using in this invention.

For a compact disk, Q data $Q_{CD}$ consists of control bit CTL and address bit Ad followed by the track number TNO of the current musical composition followed by index information INDEX. Index information INDEX is information about the subdivisions of a musical composition, the information of which enables a musical composition with a certain number to be subdivided into groups corresponding to INDEX "01" to INDEX "99". If the musical composition is not subdivided, INDEX "01" is continuously assigned up to the end position of the pertinent musical composition. In the intermission, during a pause, from the end of one musical composition to the beginning of another musical composition, the index information is INDEX "00".

Subsequently, to Q data $Q_{CD}$ is assigned intracomposition lapse information (MIN, SEC, FRAME) with measures in minutes, seconds, and frames, absolute time information (AMIN, ASEC, AFRAME), and CRC code.

To Q data $Q_{MD}$ for the magneto-optical disc 1 using in this invention is assigned track number TNO, index information INDEX, and a CRC code, but not time information. There are three values of index information INDEX: "01" to "99" indicative of "under reproduction," "00" indicative of "pausing," and "FF" indicative of "reproduction being stopping."

As will be described in detail later, system controller 18 uses index information INDEX and intracomposition lapse information (MIN, SEC, FRAME) of such Q data.

Moreover, apart from such Q data, the system controller 18 also detects whether or not there is audio data input to the first encoder/decoder 10 and uses the audio data, if any, to detect the end of a musical composition to be supplied.

Such a recordable disc medium, particularly, is usually recorded with management data for discrimination of recordable areas and recorded areas, the management data being rewritten as data is recorded or erased so that recording can always be started from a specified recordable area.

The basic recording operation of the recording/reproducing unit constituted in this way will be explained.

When the recording key of the input part 19 is operated, the system controller 18 generates the control signal to boost up the operation on the recording/reproducing unit's parts. After the operation of the focusing servo, the tracking servo, etc. are boosted up, the input signal inputted from the analog input terminal 7*a*, for example, the analog audio signal is supplied to the A/D converter 8 to convert into the digital audio signal, which is 16 [bit] digital signal. The digital audio signal is supplied to the first encoder/decoder 10, and is data compressed to about ⅕ data size, thereafter, stored once in the memory 12 via the memory controller 11. In the case where the input signal is digital signal, the digital signal is directly inputted from the digital input terminal 7*b* to the first encoder/decoder 10, and is data compressed to about ⅕ data size similarly to the case of the analog input signal. The digital data stored once in the memory 12 is read out by the memory controller 11, and is supplied to the second encoder/decoder 13. The EFM process and the error detection correction encoding process are performed to the digital data supplied to the second encoder/decoder 10, which is then converted into the recording data. The recording data is supplied to the magnetic head 6 via the head driving circuit 14. The magnetic head 6 supplies the vertical magnetic field modulated by the driving signal in accordance with the recording data to the magneto-optical disc 1. At this time, the light beam having the necessary output level to record is irradiated from the optical pick up 3 of the disc substrate side of the magneto-optical disc 1. As a result, the recording film of the magneto-optical disc 1 is heated up to the Curie temperature by the light beam irradiated from the optical pick up 3, while supplying the vertical magnetic field modulated from the magnetic head 6. Then, the temperature of recording film drops from the Curie temperature by relatively moving between the light beam and the magneto-optical disc 1. At this time, the magnetizing direction of the recording film is changed and determined, in accordance with the direction of the vertical magnetic field supplied to the magneto-optical disc 1 by the magnetic head 6, and data is recorded on the magneto-optical disc 1. In this way, the data, which is corresponding to about two [sec] (1 cluster) of the original analog audio signal, is recorded on the magneto-optical disc 1 at about 0.4 [sec]. The data is intermittently recorded to the magneto-optical disc 1 with one cluster unit.

During this recording operation, if the system controller 18 judges the occurrence of track jump due to the vibration, etc., the output level of the light beam irradiated from the optical pick up 3 lowers to the unrecordable output level immediately, and at the same time, the supplying of the recording data to the magnetic head 6 or the reading the digital data from the memory 12 is stopped. The input signal inputted from the input terminal 7*a* or 7*b* is stored in the memory 12, while the light beam irradiated from the optical pick up 3 accesses again to the position before the track jump occurs and then the access operation terminates. When the access of light beam terminates, the output level of light beam irradiated from the optical pick up 3 rises to the necessary output level to record, and simultaneously, the supplying of recording data to the magnetic head 6 re-starts and then the recording operation starts.

Further, the system controller 18 sets and controls the recording starting position in the data recording area of the magneto-optical disc 1, based on data inputted by the input part 19 or data which is read from the management area stored in the TOC memory 21. Moreover, the data which is read from the management area and stored in the system controller 18 or the memory 12, is changed to match to the recording operation at all time in recording. At the time that the data corresponding to all input signals has recorded, or before the disc cartridge is ejected from the recording/reproducing unit by operating the stop key of the input part 19, the optical pick up 3 and the magnetic head 6 access to the management area so as to update the data recorded in the management area of the magneto-optical disc 1. After the updating operation terminates, the disc cartridge is ejected from the recording/reproducing unit.

Next, the reproducing operation in the recording/reproducing unit will be explained.

When the disc cartridge is set in the recording/reproducing unit, the spindle motor 2 boosts up, and the focusing servo and the tracking servo is pulled in, thereafter, the optical pick up 3 is fed to the direction of diameter of the magneto-optical disc 1 by the feed mechanism 5 to read the management area on the magneto-optical disc 1. At this time, the output level of the light beam irradiated from the optical pick up 3 to the magneto-optical disc 6 is set to the output level that data can be not recorded, in other wards, the recording film can be not recorded to the Curie temperature. The data, which is read by the optical pick up 3 and is recorded in the management area, is stored in the TOC memory 21. Next, the optical pick up 3 is fed to the data recording area of the magneto-optical disc 1 by the feed mechanism, and the data recorded in the data recording area is read out. The system controller 18 controls the recorded data position in data recording area to read and the order to read in accordance with the input signals inputted from the input part 19. The output signal outputted from the light detector of the optical pick up 3 is supplied to the RF amplifier 15, and as described above, such signal as focusing error signal and tracking error signal, and RF signal are generated. Either of the focusing error signal, the tracking error signal, the RF signal, or the synchronization signal extracted from the address data, is supplied to the servo control circuit 17, and then the focusing servo signal, the tracking servo signal, the spindle servo signal, and the feed signal are generated in the servo control circuit 17.

The focusing servo signal and the tracking servo signal are supplied to the actuator 4 of the optical pick up 3 so as to perform the focusing servo and tracking servo. The spindle servo signal is supplied to the spindle motor 2 so as to perform the spindle servo. The RF signal is supplied to the second encoder/decoder 13 to perform EFM demodulation and error correcting process. The address data decoded by the address decoder 16 is supplied to the system controller 18 via the second encoder/decoder 13. The system controller 18 controls the optical pick up 3 to adjust the reproducing position toward the direction of diameter of the magneto-optical disc 1, based on the supplied address information. The system controller 18 manages the reproducing position on the recording track of the magneto-optical disc 1 scanned by the optical pick up 3, by using the reproduced address information. The data is intermittently read from the magneto-optical disc 1 with one cluster unit.

The digital data outputted from the second encoder/decoder 13 is stored once in the memory 12 via the memory controller 11. If no track jump, by which the reproducing position moves due to the vibration, etc., occurs in reproducing, the memory controller 11 writes the digital data in the memory 12 at the transfer rate of 1.41 [Mbit/sec], and simultaneously, read out the digital data written in the memory 12 therefrom at the transfer rate of 0.3 [Mbit/sec]. The memory controller 11 controls digital data writing to the memory 12 in order that the data stored in the memory 12 is not less than the predetermined size. When the data size in the memory 12 is not less than the predetermined size, the reading of data from the magneto-optical disc 1 stops to become a pause. In the case where the system controller 18 judges the occurrence of track jump in reproducing, the memory controller 11 stops to write the digital data outputted from the second encoder/decoder 13 to the memory 12, and controls to perform only the transfer of digital data from the memory 12 to the first encoder/decoder 10. Then, after the position of the light beam irradiated from the optical pick up 3 to the magneto-optical disc, that is, the reproducing position, is accessed to the position before the track jump occurs, the writing operation to the memory 12 of the digital data outputted from the second encoder/decoder 13 is performed again. During the period until the operation to correct the reproducing position terminates, the digital data stored in the memory 12 is read out to perform decoding and outputted from the analog output terminal 7*c*.

The digital data read out from the memory 12 is supplied to the first encoder/decoder 10 to perform the extension process. The digital audio signal outputted from the first encoder/decoder 10 is supplied to the D/A converter 9 to convert to the analog audio signal, and is outputted from the analog output terminal 7*c* to the outer unit of the exterior amplifier circuit, etc..

In this reproducing operation, while normal reproducing, the memory controller 11 controls the writing to the memory 12, in order to store the data, having the size over the data size corresponding to the necessary minimum time to correct the reproducing position, is stored in the memory 12. If the data size in the memory 12 becomes to the predetermined size and less, the memory controller 11 generates the control signal from the memory controller 18 to intermittently read out the data from the magneto-optical disc 1 by the optical pick up 3, and write the digital data from the second encoder/decoder 13 to the memory 12. Even if the DRAM having the memory capacity of 1 [Mbit], the necessary time for writing the digital data in all the memory 12 is 0.9 [sec], and this digital data is corresponding to the analog signal of about three [sec]. More specifically, when the digital data is fully stored in the memory 12, if the output signal is not supplied, due to the vibration, etc., from the optical pick up 3 which has read the magneto-optical disc 1, the analog signal can be continuously output from the analog output terminal 7*c* as the reproducing signal for about 3 [sec]. In this embodiment, since the ERAM having 4 [Mbit] memory capacity is used as the memory 12, the reproducing signal can be continuously outputted from the analog output terminal 7*c* for about 12 [sec]. While that, the reproducing position on the disc is accessed again to the position before the track jump occurs by the optical pick up 3, and the reading of the data from the magneto-optical disc 1 is performed again so as to prevent the break of the analog signal as the reproducing signal from the analog output terminal 7*c*.

After all data recorded in the magneto-optical disc 1 has reproduced, or when the stop key of the input part 19 is operated, the reproducing operation stops, and the disc cartridge is ejected from the recording/reproducing unit.

Figure 12:
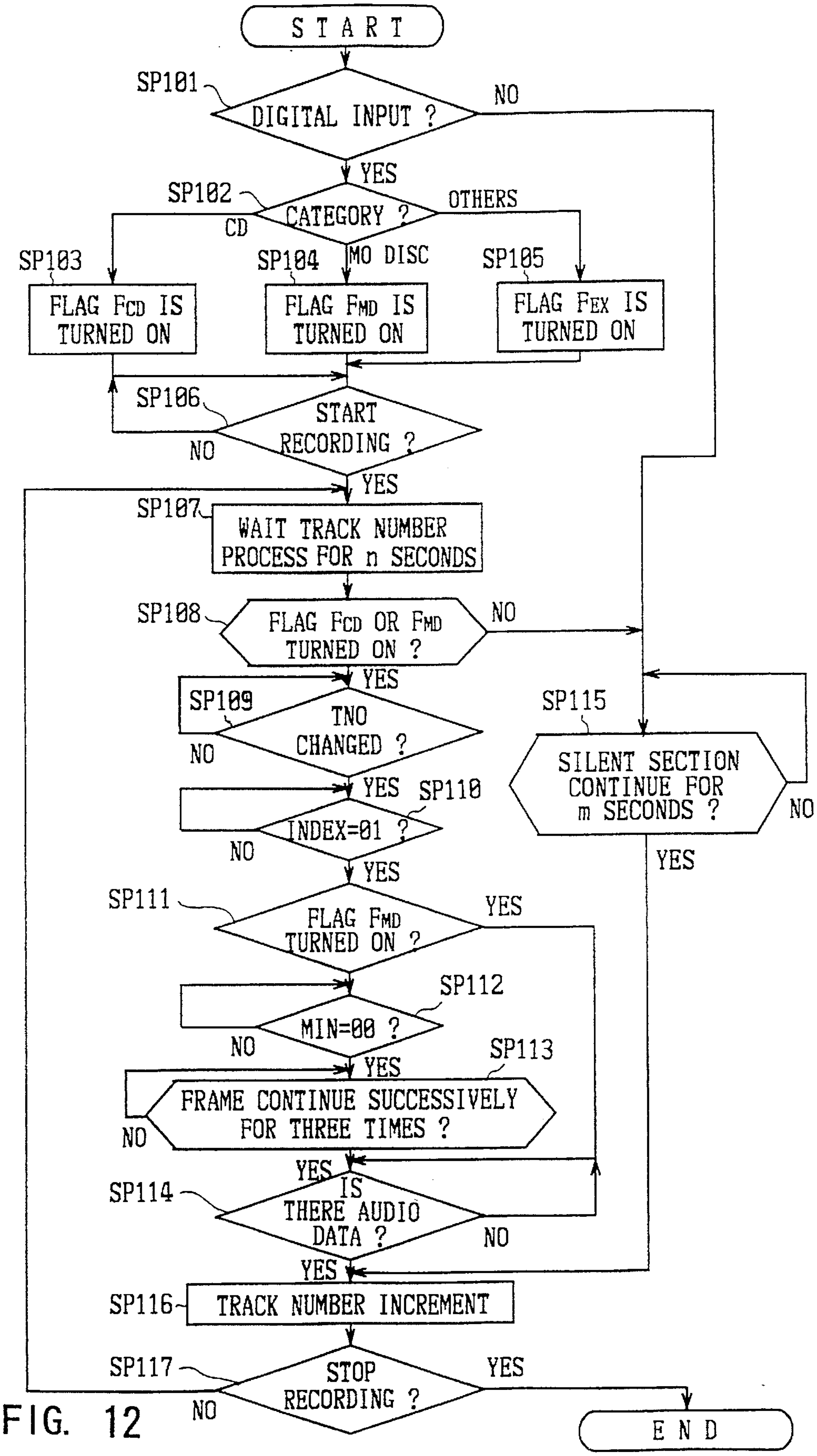
FIG. 12 is a flowchart showing the track number updating processing according to a first embodiment of the present invention.

Next, the track number update process according to the embodiment of this invention will be explained using a flowchart shown in FIG. 12. This update processing program is previously stored in the ROM (not shown) of the system controller 18.

For convenience of description, it is assumed in the present recording/reproducing unit that a compact disc player or a magneto-optical disc having same format with this invention is a power source for supplying the digital audio data to the magneto-optical disc 1 for recording, and that other sources supply analog audio signals.

In recording, the system controller 18 first determines whether the audio signal inputted to the magneto-optical disc 1 are digital data or analog signals (SP101). That is, it determines to which the analog input terminal 7*a* or the digital input terminal 7*b* the signal will be inputted.

In the case where the analog signal is inputted, control proceeds to step SP115 because there is no control data, such as sub-codes, and a silent section between musical compositions is to be detected for carrying out track number updating process automatically during recording.

In the case where the digital signal is inputted, the category information is extracted from the C bit data which is transmitted together with the inputted digital signal to determine what the recording medium as signal source is (SP102). If it is a compact disc (CD), the flag $F_{CD}$ is turned on (SP103), and if it is a magneto-optical disc having the same format with this invention, the flag $F_{MD}$ is turned on (SP104). In other cases, the flag $F_{EX}$ is turned on (SP105).

The operation to give track numbers in response to musical compositions, that is, digital signal, being recorded, begins at the time when the user starts the recording operation with the input part 19 (SP106). More specifically, the operation to update the track number at the time when the recording of digital signal corresponding to a musical composition ends and the recording of digital signal corresponding to another musical composition begins so that musical compositions to be recorded can be controlled on the management data in response to track numbers. Furthermore, track number "1" is given to the digital signal corresponding to the first musical composition at the time when the recording operation begins, but if some data have already been recorded on the magneto-optical disc, the next number of the number of musical compositions recorded is regarded as a first track number at the time when the recording operation begins. The number of musical compositions and the track numbers recorded can be determined by the management data stored in the TOC memory 21.

Even if the recording operation begins, the process waits for "n" seconds, e.g., two seconds after the start of recording operation to prevent erroneous update immediately after the update of track numbers (SP107). This is usually set at a value at which the track number will not be updated in a short time. If the time is set at about two seconds for example, it is effective for preventing erroneous updating of track numbers by change in sub-code during the search operation because it does not happen that a track of a musical composition ends in two seconds after the update of track number and moves to the next track, the next musical composition. Of course, the time can be longer than two seconds.

In addition, such waiting time is suitable for the recording of musical compositions, but in cases of recording voice signal such as conversations, etc., for example, it is necessary to set this time fairly short because the time of sound signal itself of one unit in which a track number is given can be considered to be fairly short. Therefore, it is desired that the waiting time is changed in accordance with the type of digital data to be recorded.

Whether or not the flag $F_{CD}$ or flag $F_{MD}$ is turned on is checked after the waiting time passes (SP108). In cases where the flag $F_{CD}$ or $F_{MD}$ is not turned on, the source is a CD or a magneto-optical disc having the same format with this invention, and there is no W data necessary for track number processing. In this case, the process proceeds to step SP115 similar to the case of analog input and the track number update processing is to be performed based on the detection of a silent section. That is, if the silent section continues for a predetermined period of time, it is determined to be a section between musical compositions and the track number is updated (SP115–SP116).

In cases where the signal source is a CD or a magneto-optical disc having the same format with this invention, the process proceeds to step SP109 and the track number information TNO of Q data is determined.

Even if the track number information TNO changes, the track number is not updated immediately and the index information INDEX is determined (SP110). When the index information INDEX is "00", the process is at a section between musical compositions and not at the point where the track number is to be updated. The process waits up to a position where next musical composition or audio data with INDEX of "01" starts. In cases where INDEX="02"–"99", the process is in the middle of a musical composition and the audio data at that time is not at a point where the track number information TNO should change. That is, this means that the change point of the track number information TNO was erroneously determined and this erroneous determination is canceled by the determination of index information INDEX.

If index information INDEX is determined as "01", the flag $F_{MD}$ is determined next (SP111). When the flag $F_{MD}$ is on, that is, when the signal source is a magneto-optical disc having the same format with this invention, the process proceeds to step SP114 because the progress time information is not obtained as Q data $Q_{CD}$.

If cases where the flag $F_{MD}$ is off and the signal source is a CD, the progress time information in a musical composition in the Q data $Q_{CD}$ is determined. That is, it is determined whether or not the process is at the head position of a musical composition by whether or not the minute information MIN is "00". Then, it is determined whether or not the state is a normal reproduction state in which the frame is obtained from the frame information FRAME successively for three times, in other wards, whether or not the frame is skipped by track jump, such as search operation, and then the process proceeds to step SP114.

In step SP114, it is determined whether or not audio data has been actually supplied. If there is no audio data of a predetermined level or more at that point in step SP114, the process waits for updating the track number. The point where audio data is actually obtained is taken as the head position of a musical composition or a audio data. The process proceeds to step SP116 and the track number is updated.

The process waits for "n" seconds in step SP107 immediately after the track number is updated to prevent erroneous update similarly to the above cases where the recording operation starts. Then, the operation similar to that mentioned above is repeated. The musical compositions or the audio data recorded are properly given track numbers to manage by performing the above processing until the recording operation is stopped (SP117). That is, the recording position is controlled in response to the track numbers on the management data. In addition, if the signal source is digital audio tape (DAT), it can be treated as a CD, and the DAT is processed similar to a CD.

In the first embodiment, the track number at the time of recording digital input data is updated as follows. At first, the change in track number is detected, then the reach from a section between musical compositions to start position of a musical composition or audio data is detected by index information. Further, in cases where the source is a CD, it is confirmed by progress time information that the position is the head position of a musical composition or audio data and the source device is in a normal reproduction state, and furthermore, it is confirmed that the position is a point where the audio output is actually started. As a result, erroneous update of the track number is prevented and the track number is given accurately at the head position of a musical composition which is more suitable than a section between musical compositions.

In addition, erroneous update of the track numbers can be prevented by giving a process wait time immediately after of recording operation and the update of the track number.

Figure 13:
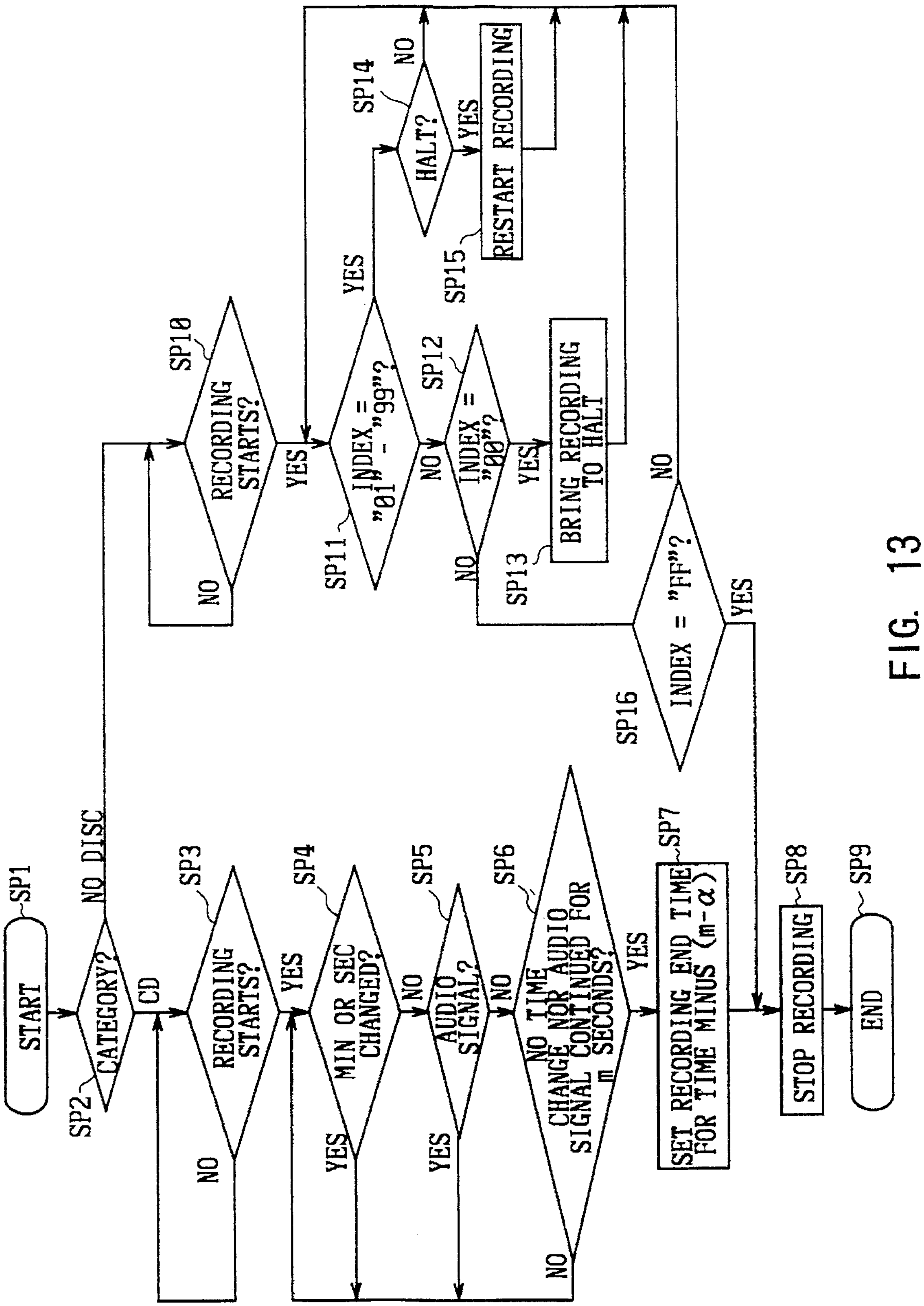
FIG. 13 is a flowchart showing the automatic recording stop processing according to a second embodiment of the present invention.

The following explains how the system controller 18 exercises recording stop control in a second embodiment in reference to the flowchart in FIG. 13.

For the sake of convenience of explanation, it is assumed that a compact disc player or the other recording/ reproducing unit similar to the magneto-optical disc recording/reproducing unit of this invention are provided as a signal source for supplying digital audio data to be recorded onto the magneto-optical disc 1 similar to the first embodiment and analog audio signals are supplied from some other signal source. In addition, one possible signal source of digital signal would be digital audio tape (DAT), but an explanation of DAT as a digital signal source is omitted here similar to the case of the first embodiment, because its processing basically conforms to that of a compact disc (CD).

In recording, the system controller 18 first discriminates whether the audio signal input for being recorded onto the magneto-optical disc 1 is digital data or an analog signal, or discriminates to which the analog input terminal 7*a* or the digital input terminal 7*b* the audio signal is going to be input therefrom.

In the case of analog input signal, it should be noticed that the automation of a recording stop process entails detecting a mute interval during recording and stopping recording through judgment of the end of a supply of audio signals from signal source if the mute interval has continued for at least a specified length of time, in as much as analog input signals lack control data, such as sub-codes. The automation of a recording stop process will be described later.

For digital input, the system controller 18 of this embodiment performs the following process as shown in FIG. 13. This processing program is previously written in a ROM (not shown) of the system controller 18.

The system controller 18 first proceeds from step SP1 to step SP2 to detect category information in C bit data transmitted together with audio data, and discriminates between a compact disc (CD) and a magneto-optical disc having the same format with the magneto-optical disc in this invention as a recording medium which is signal source.

If there is a CD, then the system controller 18 proceeds to step SP3 to stand by with a recording start operation. If it is a magneto-optical disc having the same format with this invention, the system controller 18 proceeds to step SP10 to stand by with a recording start operation.

Subsequently, when a CD is the signal source, the system controller 18 proceeds from step SP3 to step SP4 if a user inputs recording operations from the input part 19 to start monitoring the supplied digital data for an end state.

That is, the system controller 18 at step SP4 first detects lapse information (MIN, SEC) in Q data $Q_{CD}$ and monitors changes in the lapse information. When the lapse information ceases to change any longer, in which the reproduction on the part of the CD terminates, the system controller 18 proceeds to step SP5 to judge whether or not audio data in digital data is actually being contained.

When the lapse information has ceased to change and no audio data occurs any more, the system controller 18 can confirm that the compact disc player is almost surely in a reproduction end state. In this state, the system controller 18 does not immediately stop recording, but proceeds to step SP6 to set the standing by state for "m" seconds, e.g., about ten seconds and in the meanwhile makes sure that there is still no change in lapse information and no audio data occurs. By setting a certain length of standby time like this, it becomes possible to mistaken judgement of an end of reproduction even if there occurs a state such that the lapse information ceases to change because of such an operation as track access on the part of the compact disc player.

When it is confirmed that there has been no change in lapse information during a state of standby for "m" seconds and in the meanwhile there has occurred no audio data, the system controller 18 proceeds to a recording stop process on the recording/reproducing unit on its judgement that the compact disc player has terminated reproduction.

That is, the system controller 18 then proceeds to step SP7 and sets the recording end time position for a point of time determined by subtracting (m−α) from the moment, recording time position, of time when it was judged that the compact disc player terminated reproduction. That is, the system controller 18 writes as the end address of the recorded audio data the track address of a location determined by subtracting (m−α) from the time position where it was judged that reproduction ended into the user TOC, where α is set at about one second, for example, and thus a time position with an allowance of about one second from the time position where the lapse information ceased to change and audio data ceased to occur is regarded as a recording end position.

Subsequently, the system controller 18 proceeds to step SP8 to stop actual recording and then proceeds to step SP9 to terminate the processing procedure.

By going through these processes, the recording/reproducing unit is enabled to avoid needless recording in a mute state through terminating recording operations automatically as a compact disc player, which is the signal source, stops reproduction even when there is still enough recordable space left in the data recording are on the magneto-optical disc 1.

If the signal source is a magneto-optical disc having the same format with this invention, on the other hand, the system controller 18 at step SP10 detects a recording start time and then proceeds to step SP11 to monitor Q data $Q_{MD}$ for index information INDEX.

In the case where the signal source is the magneto-optical disc described above, index information INDEX can be any of "01" to "99" during reproduction; is "00" during a pause; and is "FF" during a reproduction stop. Thus, the system controller 18 can detect a stop of reproduction through monitoring states resulting in INDEX="FF".

The system controller 18 first monitors if INDEX="01" to "99" at step SP11 and then if otherwise, monitors whether or not INDEX="00" at step SP12. When INDEX="00", or when the magneto-optical disc recording/reproducing unit to be the signal source has come to a pause, the system controller 18 proceeds to step SP13 and temporarily stops the recording operation of the recording/reproducing unit of this invention in which the signal is supplied. The system controller 18 then goes back to step SP11 and performs the processes of steps SP14 and SP15 in sequence when INDEX="01" to "99". Hence, if the recording/reproducing unit for being supplied is in the current temporary stop state, this state is reset, and then the system controller 18 proceeds to recording operations again.

In response to such signal source, the temporary stoppage of recording can be brought about also where the signal source is a CD, in which it is needed to detect index information before proceeding to step SP4 mentioned above.

When index information INDEX is neither "01" to "99" nor "00", the system controller 18 proceeds from step SP11 through step SP12 to step SP16, thereon judging whether or not INDEX="FF". If INDEX="FF", the reproduction of the magneto-optical disc having the same format with this invention as the source is regarded as having been terminated, so the system controller 18 will regard the point of time when the reproduction of the magneto-optical disc ended as the point of time when the recording operations of recording/reproducing unit on the magneto-optical disc 1 ended. Further, in this case, the recording end time position is when the state INDEX="FF" was detected.

Yet, a standby processing can be performed to detect an exact end of reproduction, similar to the above step SP6 following the detection of INDEX="FF", in which the recording end time position is set for a time position as long as (m–α) before the end of standby state time.

By performing these processes, the recording/reproducing unit of this invention can automatically terminate recording as a magneto-optical disc recording/reproducing unit which is signal source using the same format with this invention comes to stop reproduction similar to the case where the signal source is a compact disc player, and thus can avoid needless recording in a mute state to the magneto-optical disc 1.

Even where some signal source other than a CD, magneto-optical disc having the same format with this invention, or DAT is possibly employed, the recording/reproducing unit needs only to exercise recording end control through detecting a stop of reproduction on the part of the signal source by using both simultaneously transmitted control data and discrimination as to the occurrence or nonoccurrence of control data and audio data according to the format of control information added to the data.

The above-described constitution enables automatic termination of recording upon completion of the sound reproduction of audio equipment in recording music information from audio equipment in recording medium units, thereby simplifying the entire operation.

The third embodiment will be explained hereinafter with reference to FIG. 14.

As a matter of course, if performances of musical compositions selected by a user could be recorded automatically in music composition units, the ease-of-use and convenience of recording/reproducing units of this kind would undoubtedly be improved.

Figure 14:
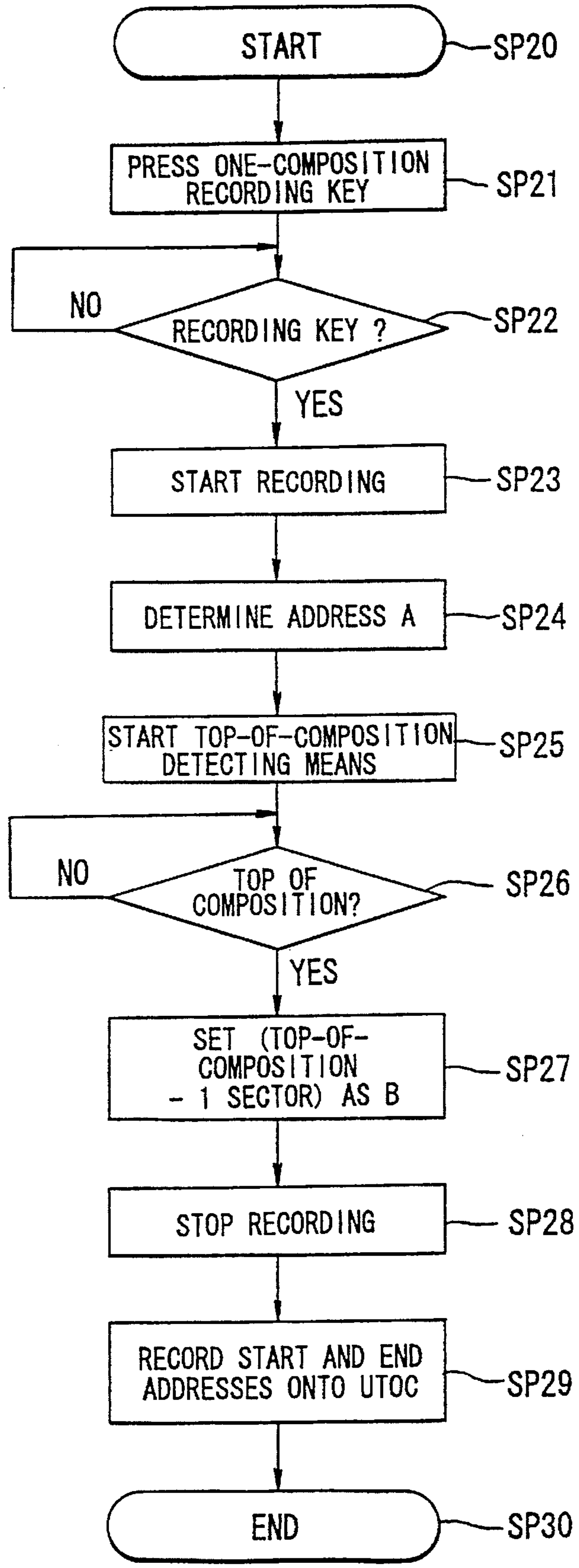
FIG. 14 is a flowchart showing the recording operation of one composition according to a third embodiment of the present invention.

For this purpose, in the embodiment here, the system controller 18 has been designed so as to follow the processing procedure shown in FIG. 14 to record performances of musical compositions automatically in musical composition units.

That is, the system controller 18 proceeds from step SP20 to step SP21, thereon judging whether the key for recording one musical composition was pressed.

In the third embodiment, the magneto-optical disc recording/reproducing unit is so designed as to arrange ordinary recording keys and a key for recording one musical composition on a input part 19. When the recording key for recording one musical composition is pressed, the system controller 18 proceeds to step SP22 to judge whether or not the recording key is pressed.

After a user operates the compact disc player to locate the top of the musical composition desired, the reproducing key on the part of the compact disc player and the recording key in the input part of the recording/reproducing unit are pressed. The system controller 18 proceeds to step SP23, thereupon sending control data to the signal processing circuits, such as the first encoder/decoder section 10 and the memory controller 11, and the servo control circuit 17 to switch the operation mode of the system to the recording mode.

At subsequent step SP24, the system controller 18 gains access to the TOC memory 21, detects a recordable area pointed to by a pointer (P-EMPTY), and sets the start address A of the leading part P of the recordable area based on the result of the detection.

Subsequently, the system controller 18 proceeds to step SP25, thereon starts monitoring control data sent from the compact disc player after the lapse of a specified duration and thus starts detecting the top of a subsequent musical composition at step SP26 before proceeding to step SP27.

The system controller 18 then starts monitoring control data after the lapse of a specified duration so as not to mistake a mute period immediately following the start of recording for an intermission between two musical compositions, thereby reliably detecting the start of a subsequent musical composition.

The system controller 18 then monitor Q data $Q_{CD}$ as control data for index information and judges whether or not the position in question is the top of a subsequent musical composition. If a negative result is obtained, the system controller 18 repeats step SP26, whereas if the top of a subsequent musical composition is detected, the system controller 11 proceeds to step SP27.

The system controller 18 then detects the sector being recorded with regard to the initial position of the subsequent musical composition detected at step SP26, and sets a sector recorded immediately prior to the sector in question as end sector B.

Thereby, the system controller 18 first sets start address A and then sets a link pointer if necessary, and subsequently designates parts P in sequence and set the last sector as end sector B to update the TOC memory 21.

If a start address and an end address have thus been set, the system controller 18 proceeds to step SP28 to exert stop control over recording operations and then proceeds to step SP29 to rewrite the management area of the magneto-optical disc 1, thereby updating the management data of the magneto-optical disc 1 with the contents of the TOC memory 21 before terminating this processing procedure at step SP30.

The constitution shown in FIG. 14 enables automatic recording in musical composition units without bringing recording operations to a stop after a user's making sure of the end of each musical composition, thus improving the easiness-of-use of the recording/reproducing unit.

In this embodiment, the end of each musical composition is detected by detecting the signal level of input signal and the signal level of audio information instead of control data output from digital audio equipment, thereby recording audio signals on the magneto-optical disc 1 in musical composition units or in recording medium units on the signal source side.

The fourth embodiment of this invention will be explained hereinafter using FIG. 15.

Figure 15:
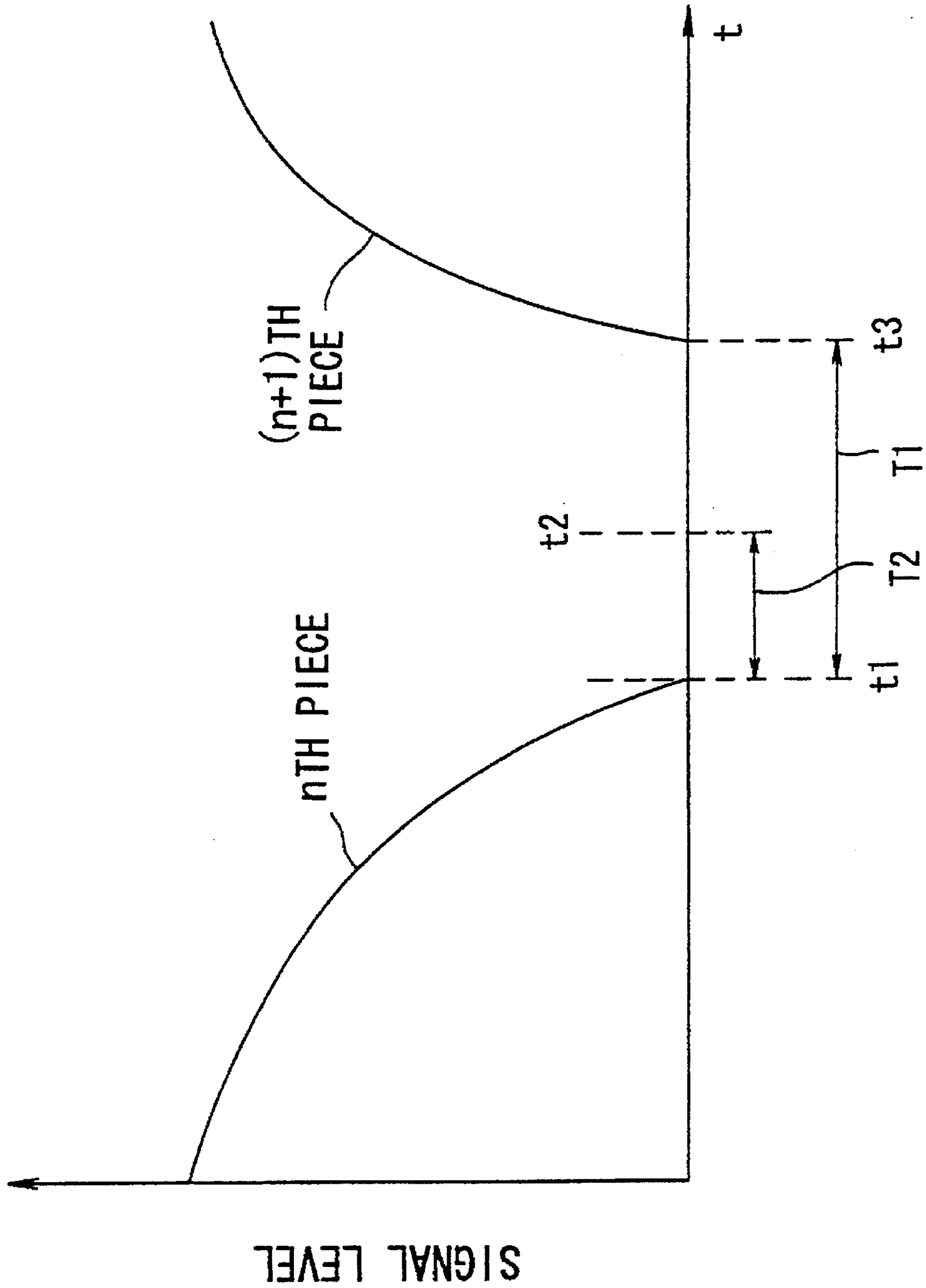
FIG. 15 is a signal waveform diagram for the explanation of the recording operation according to a third embodiment of the present invention.

As shown in FIG. 15, the system controller 18, when it starts recording, detects a point of time t1, when the signal level falls to level 0 by detecting the signal levels of audio data in sequence, or by detecting the signal levels of inputted analog signal, and judges this point of time t1, as the end position of a performance of a musical composition selected by a user, which is the inputted analog signal or the reproduction of audio data, when this signal level of inputted analog signal or the audio data is retained at level 0 for a specified period, T1.

Thus, the system controller 18 sets the end address of data recorded on the magneto-optical disc 1 to another point of time t2, after a lapse of a specified period T2, from t1 and updates the management data of the TOC memory 21. In addition, after the recording operation to the magneto-optical disc 1 starts, the signal level of audio information of audio data or the signal level of inputted analog signal is detected after a lapse of specified time from the starting of the recording operation to the magneto-optical disc 1. As shown in FIG. 15, this is because if the signal level is detected as soon as the recording starts, the end of the preceding musical composition is possibly detected.

In this way, the system controller 18 can detect an interval between two musical compositions and the end of a recording medium by selecting the length of this period T1, according as recording is to be done in musical composition units or in recording medium units. The system controller 18 is enabled to perform an automatic recording process both when recording performances in musical composition units and when recording performances in recording medium units.

According to the constitution shown in FIG. 15, a desired audio data or analog signal can be automatically recorded to the magneto-optical disc 1 in musical composition units or in recording medium units, even if stop control is exerted over recording operations, on the basis of the results of detecting the signal levels of audio signals which is audio data or the signal levels of analog signal inputted from the input terminal 7*a* to detect the end of each musical composition.

For the embodiments mentioned above, descriptions have been confined to some cases where this invention is applied to recording/reproducing units using a magneto-optical disc unit, but the scope of this invention is not restricted to recording/reproducing units, but this invention can be widely applied to recording-only devices as well. Moreover, this invention can be widely applied also to recorders compatible with various re-loadable optical discs and various tape recording media, as well as to recorders compatible with magneto-optical discs.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A recording method for recording an inputted digital signal on a recording medium in which management data corresponding to said recorded digital signal is recorded, comprising the steps of:

recording said inputted digital signal on said recording medium and detecting an information changing point in the inputted digital signal by detecting at least three of a change of track number in said inputted digital signal, a change of index information which is present a silence portion, a continuity of reproduction time information in the inputted digital signal, and an existence of silence data in said inputted digital signal; and updating said management data corresponding to the digital signal recorded on said recording medium after said information changing point is detected.

2. A recording method according to claim 1, wherein:

said management data updating step is performed after setting a waiting state for a predetermined time from the point of a record starting time of said inputted digital signal.

3. A recording method according to claim 1, further comprising the step of:

detecting whether said inputted signal is a digital signal or not, before said recording operation to said recording medium starts.

4. A recording method for recording an inputted digital signal on a recording medium in which the inputted digital signal is outputted with sub-code data from a signal source in which the digital signal is recorded with the sub-code data, comprising the steps of:

(a) detecting whether the inputted signal is a digital signal or not;

(b) starting the recording of the digital signal on the recording medium if it is detected in step (a) that the inputted signal is a digital signal and setting an operation for changing a track number to a waiting state for a fixed time;

(c) if it is detected in step (a) that the inputted signal is not a digital signal, then detecting whether a mute section of the inputted signal continues for a predetermined period of time or not;

(d) determining a changing point of the track number as occurring if the mute section detected in step (c) continues for the predetermined period of time and then updating the track number of data to be recorded on the recording medium;

(e) detecting, after step (b), a track number changing point;

(f) detecting, after a track number changing point is detected in step (e), whether or not an index information of the sub-code data arrives in a head position of an inputted next digital signal; and (g) if it is detected in step (f) that the index information arrives at the head position, updating the track number of data to be recorded in the recording medium.

5. A recording method for recording a digital signal, which is reproduced with sub-code information from a first recording medium in which the digital signal is recorded with the sub-code data, to a second recording medium, comprising the steps of:

(a) beginning recording of the digital signal read from the first recording medium to the second recording medium and pausing changing of a track number to be recorded in the second recording medium for a fixed waiting time;

(b) determining whether the signal which is reproduced from the first recording medium is a digital signal or not;

(c) if the signal is detected in step (b) as not being a digital signal, detecting a mute section of the digital signal and determining whether the detected mute section continues for a predetermined period of time or not;

(d) if the mute section detected in step (c) continues for the predetermined period of time, determining that a changing point of the track number of sub-code outputted with the digital signal from the first recording medium has occurred;

(e) if it is detected in step (b) that the signal is a digital signal, detecting a track number changing point and then detecting whether an index information of sub-code outputted with the digital signal from the first recording medium arrives at a head position of the next reproduced digital signal from the first recording medium or not; and (f) after detecting the arrival of the index information in step (e), detecting if the signal is audio data and, if the signal is audio data, updating the track number of data to be recorded to the second recording medium.

6. A recording method for recording an inputted signal on a recording medium in which the inputted signal, if it is a digital signal, is outputted with sub-code data from a signal source in which the signal is recorded with the sub-code data, comprising the steps of:

(a) detecting whether the inputted signal is a digital signal or not;

(b) if it is detected in step (a) that the inputted signal is not a digital signal, starting recording of the inputted signal on the recording medium while simultaneously detecting whether a mute section of the inputted signal continues for a predetermined period of time or not;

(c) determining that a changing point of the track number has occurred if the mute section detected in step (b) continues for the predetermined period of time and then updating the track number of data to be recorded on the recording medium;

(d) if it is detected in step (a) that the inputted signal is a digital signal, starting the recording of the inputted signal on the recording medium and setting an operation for changing a track number to a waiting state for a fixed time;

(e) detecting, after step (d), a track number changing point;

(f) detecting, after a track number changing point is detected in step (e), whether or not an index information of the sub-code data currently equals the predetermined beginning of an index string; and (g) if it is detected in step (f) that the index information equals the predetermined beginning of an index string, updating the track number of data to be recorded in the recording medium.

7. A recording method for recording a digital signal, which is reproduced with subcode information from a first type of recording medium in which the digital signal is recorded with the sub-code data, to a second recording medium, comprising the steps of:

(a) determining the type of the first recording medium and setting a corresponding type flag;

(b) beginning recording of the digital signal read from the first recording medium to the second recording medium and pausing changing of a track number to be recorded in the second recording medium for a fixed waiting time;

(c) detecting the type flag and if the type flag is set for other than a compact disc (CD) or a magneto-optical disc (MD), then determining if a muted section occurs in the inputted signal for a predetermined of time;

(d) if it is detected in step (c) that the muted section occurs for the predetermined of time, updating the track number of the data being recorded on the second recording medium;

(e) if at step (c) the type flag of a CD or an MD is detected, then detecting a track number changing point;

(f) after a track number changing point is detected at step (e), then detecting whether an index information of sub-code outputted with the digital signal from the first recording medium arrives at the leading position of the next reproduced digital signal from the first recording medium or not; and (g) after detecting the arrival of the index information in step (f), detecting if the signal is audio data and, if the signal is audio data, updating the track number of data to be recorded to the second recording medium.

8. A recording method for recording a digital signal according to claim 7 further comprising the step of detecting if the type flag is set to MD after detecting the track number changing point in step (f) and then if it is detected that the type flag is not set to MD, it is then detected whether or not a minute information (MIN) is equal to "00" and, if so, whether or not a frame information of the inputted signal continues successively for three times before proceeding to step (g).

* * * * *